United States Patent
Alshin et al.

(10) Patent No.: US 10,432,945 B2
(45) Date of Patent: Oct. 1, 2019

(54) PROBABILITY UPDATE METHOD FOR BINARY ARITHMETIC CODING/DECODING, AND ENTROPY CODER/DECODER USING THE SAME

(71) Applicant: SAMSUNG ELECTRONICS CO., LTD., Suwon-si (KR)

(72) Inventors: Alexander Alshin, Suwon-si (KR); Elena Alshina, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 48 days.

(21) Appl. No.: 15/524,327

(22) PCT Filed: Nov. 4, 2015

(86) PCT No.: PCT/KR2015/011794
§ 371 (c)(1),
(2) Date: May 4, 2017

(87) PCT Pub. No.: WO2016/072744
PCT Pub. Date: May 12, 2016

(65) Prior Publication Data
US 2017/0339413 A1    Nov. 23, 2017

Related U.S. Application Data

(60) Provisional application No. 62/074,943, filed on Nov. 4, 2014.

(51) Int. Cl.
H04N 7/12        (2006.01)
H04N 11/02       (2006.01)
(Continued)

(52) U.S. Cl.
CPC .......... *H04N 19/149* (2014.11); *H04N 19/13* (2014.11); *H04N 19/21* (2014.11); *H04N 19/34* (2014.11); *H04N 19/50* (2014.11); *H04N 19/33* (2014.11)

(58) Field of Classification Search
None
See application file for complete search history.

(56) References Cited

U.S. PATENT DOCUMENTS 7,535,387 B1 * 5/2009 Delva ................ H03M 7/4006
                                                              341/107
7,573,951 B2    8/2009 Kim
(Continued)

FOREIGN PATENT DOCUMENTS

CN        1735209 A    2/2006
CN      101106378 A    1/2008
(Continued)

OTHER PUBLICATIONS

Alshin, et al., "CE1 (subset B): Multi-parameter probability up-date for CABAC", 2011, Joint Collaborative Team on Video Coding (JCT-VC) of ITU-T SG16 WP3 and ISO/IEC JTC1/SC29/WG11, JCTVC-G764, 4 pages total, XP 030110748.
(Continued)

*Primary Examiner* — Chikaodili E Anyikire
(74) *Attorney, Agent, or Firm* — Sughrue Mion, PLLC

(57) ABSTRACT

A probably update method used in context-based adaptive binary arithmetic coding (CABAC) is disclosed. The probably update method for binary arithmetic decoding obtains an autocorrelation value of each bin by using values of received bins, determines at least one scaling factor used to update a probability of a binary value based on the autocorrelation value, and updates a probability used in context-
(Continued)

based adaptive binary arithmetic decoding by using the determined at least one scaling factor.

9 Claims, 24 Drawing Sheets

(51) Int. Cl.
*H04N 11/04* (2006.01)
*H04N 19/149* (2014.01)
*H04N 19/50* (2014.01)
*H04N 19/13* (2014.01)
*H04N 19/21* (2014.01)
*H04N 19/34* (2014.01)
*H04N 19/33* (2014.01)

(56) References Cited

U.S. PATENT DOCUMENTS

| | | | |
|---|---|---|---|
| 9,014,260 B2 | 4/2015 | Alshin et al. | |
| 9,036,701 B2 | 5/2015 | Lainema et al. | |
| 9,083,374 B2* | 7/2015 | Marpe | H03M 7/40 |
| 9,661,326 B2 | 5/2017 | Alshin et al. | |
| 2009/0034856 A1* | 2/2009 | Moriya | G06T 9/004 |
| | | | 382/238 |
| 2009/0123066 A1* | 5/2009 | Moriya | H04N 19/139 |
| | | | 382/166 |
| 2009/0175331 A1 | 7/2009 | Karczewicz et al. | |
| 2011/0285557 A1* | 11/2011 | Korodi | H03M 7/4006 |
| | | | 341/52 |
| 2012/0328026 A1 | 12/2012 | Sole Rojals et al. | |
| 2013/0287120 A1 | 10/2013 | Kwon et al. | |
| 2013/0300591 A1 | 11/2013 | Marpe et al. | |
| 2014/0177708 A1 | 6/2014 | Alshin et al. | |
| 2016/0043735 A1* | 2/2016 | Zhou | H03M 7/4018 |
| | | | 341/107 |
| 2017/0339413 A1 | 11/2017 | Alshin et al. | |

FOREIGN PATENT DOCUMENTS

| | | |
|---|---|---|
| CN | 102474599 A | 5/2012 |
| CN | 103181167 A | 6/2013 |
| CN | 103797803 A | 5/2014 |
| EP | 2760201 A2 | 7/2014 |
| KR | 1020130002298 A | 1/2013 |
| KR | 1020130122353 A | 11/2013 |
| WO | 2013002585 A2 | 1/2013 |

OTHER PUBLICATIONS

Alshin, et al., "Multi-parameter probability up-date for CABAC", 2011, Joint Collaborative Team on Video Coding (JCT-VC) of ITU-T SG16 WP3 and ISO/IEC JTC1/SC29/WG11, JCTVC-F254, 5 pages total, XP 030009277.
Communication dated Sep. 27, 2017, issued by the European Patent Office in counterpart European Patent Application No. 15857204.0.
Communication dated Feb. 25, 2016, issued by the International Searching Authority in counterpart International Application No. PCT/KR2015/011794 (PCT/ISA/210 & PCT/ISA/237).
Alexander Alshin et al: "High Precision Probability Estimation for CABAC", Visual Communications and Image Processing (VCIP), Nov. 17-20, 2013, pp. 1-6, (6 pages total).
Patent Examination Report No. 1 issued by the Australian IP Office in counterpart Australian Patent Application No. 2015343932 dated Apr. 15, 2019.
Communication dated Jun. 25, 2019, from the State Intellectual Property Office of People's Republic of China in counterpart Application No. 201580071892.7.

* cited by examiner

PROBABILITY UPDATE METHOD FOR BINARY ARITHMETIC CODING/DECODING, AND ENTROPY CODER/DECODER USING THE SAME

This application is a National stage entry of International Application No. PCT/KR2015/011794, filed on Nov. 4, 2015, which claims priority from U.S. Provisional Application No. 62/074,943, filed on Nov. 4, 2014 in the United State Patent and Trademark Office. The disclosures of each of the applications are herein incorporated by reference in their entirety.

TECHNICAL FIELD

The present disclosure relates to entropy coding and decoding, and more particularly, to a probability model update method and apparatus used in context based binary arithmetic coding and decoding.

BACKGROUND ART

In H.264 and MPEG-4, a video signal is hierarchically split into a sequence, frame, slice, macro block, and block. The block becomes a smallest processing unit. With regard to encoding, residual data of the block is obtained through intra frame prediction or inter frame prediction. Also, the residual data is compressed through transformation, quantization, scanning, run length coding, and entropy coding. As an entropy coding technique, there is context-based adaptive binary arithmetic coding (hereinafter referred to as CABAC). In accordance with CABAC, a context index ctxIdx is used to determine one context model, an occurrence probability of a least probable symbol (LPS) or a most probable symbol (MPS) of the determined context model and information valMPS about which binary value between 0 and 1 corresponds to the MPS are determined, and binary arithmetic coding is performed based on valMPS and a probability of the LPS.

DETAILED DESCRIPTION OF THE INVENTION

Technical Problem

The technical problem that is to be solved by the present disclosure is to enhance image compression efficiency by improving a probability update process performed during a context-based binary arithmetic coding/decoding process.

Technical Problem

According to embodiments of the present disclosure, a scaling factor is determined based on autocorrelation values of bins or an entropy value of a bin, and a probability used in binary arithmetic coding and decoding is updated by using the determined scaling factor.

Advantageous Effects of the Invention

According to embodiments of the present disclosure, a bit occurrence amount caused by arithmetic coding can be reduced by minimizing an error value between a bin value and a bin prediction probability.

BEST MODE

Figure 1:
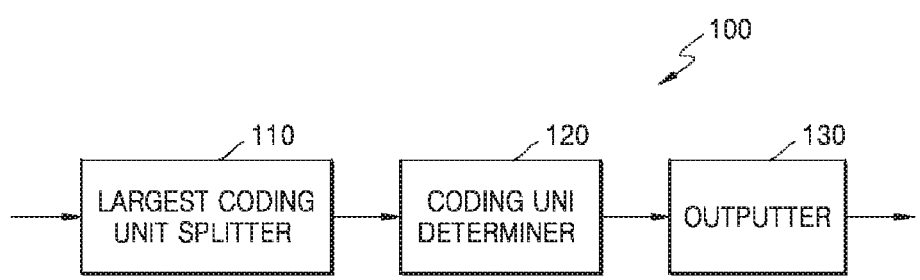
FIG. 1 is a block diagram of a video encoding apparatus according to an embodiment of the present disclosure.

According to an embodiment of the present disclosure, a probability update method for binary arithmetic decoding includes receiving a predetermined number of bins that are to be binary arithmetic decoded; obtaining an autocorrelation value of each of the bins by using values of the received predetermined number of bins; determining at least one scaling factor used to update a probability of a binary value based on the autocorrelation value; updating a probability used in context-based adaptive binary arithmetic decoding by using the determined at least one scaling factor; and arithmetic decoding a current bin by using the updated probability.

According to an embodiment of the present disclosure probability update method for binary arithmetic coding includes receiving a predetermined number of bins that are to be binary arithmetic coded; obtaining an autocorrelation value of each bin by using values of the received predetermined number of bins; determining at least one scaling factor used to update a probability of a binary value based on the autocorrelation value; updating a probability used in context-based adaptive binary arithmetic coding by using the determined at least one scaling factor; and arithmetic coding a current bin by using the updated probability.

According to an embodiment of the present disclosure probability update method for binary arithmetic decoding includes receiving a predetermined number of bins that are to be binary arithmetic decoded obtaining entropy values indicating an average bit value of the bins by using a plurality of probability models having different scaling factors; determining a scaling factor of a probability model used to obtain a minimum entropy value among the plurality of probability models; and performing context-based adaptive binary arithmetic decoding including a probability update process using the determined scaling factor on the bins.

According to an embodiment of the present disclosure, a probability update method for binary arithmetic coding includes receiving a predetermined number of bins that are to be binary arithmetic coded; obtaining entropy values indicating an average bit value of the bins by using a plurality of probability models having different scaling factors; determining a scaling factor of a probability model used to obtain a minimum entropy value among the plurality of probability models; and performing context-based adaptive binary arithmetic coding including a probability update process using the determined scaling factor on the bins.

According to an embodiment of the present disclosure, an entropy decoding apparatus includes an inverse binarizer configured to map values of predetermined syntax elements to bins of a binary value; a context modeler configured to receive a predetermined number of bins that are to be binary arithmetic decoded, obtain an autocorrelation value of each bin by using values of the received predetermined number of bins, determine at least one scaling factor used to update a probability of a binary value based on the autocorrelation value, and update a probability used in context-based adaptive binary arithmetic decoding by using the determined at least one scaling factor; and a regular coder configured to arithmetic decode a current bin by using the updated probability.

According to an embodiment of the present disclosure, an entropy encoding apparatus includes a binarizer configured to map values of predetermined syntax elements to bins of a binary value; a context modeler configured to receive a predetermined number of bins that are to be binary arithmetic coded, obtain an autocorrelation value of each bin by using values of the received predetermined number of bins, determine at least one scaling factor used to update a probability of a binary value based on the autocorrelation value, and update a probability used in context-based adaptive binary arithmetic coding by using the determined at least one scaling factor; and a regular coder configured to arithmetic code a current bin by using the updated probability.

According to an embodiment of the present disclosure, an entropy decoding apparatus includes an inverse binarizer configured to map bins of a binary value to a value of a predetermined syntax element; a context modeler configured to receive a predetermined number of bins that are to be binary arithmetic decoded, obtain entropy values indicating an average bit value of the bins by using a plurality of probability models having different scaling factors, determine a scaling factor of a probability model used to obtain a minimum entropy value among the plurality of probability models, and perform a probability update process using the determined scaling factor; and a regular decoder configured to arithmetic decode a current bin by using an updated probability.

Preferred examples of the present disclosure will be described in detail with reference to the accompanying drawings.

FIG. 1 is a block diagram of a video encoding apparatus according to an embodiment of the present disclosure.

A video encoding apparatus 100 according to an embodiment includes a largest coding unit (LCU) splitter 110, a coding unit determiner 120, and an outputter 130.

The LCU splitter 110 may split a current picture based on a LCU that is a coding unit having a maximum size for a current picture of an image. If the current picture is larger than the LCU, image data of the current picture may be split into the at least one LCU. The LCU according to an embodiment may be a data unit having a size of 32×32, 64×64, 128×128, 256×256, etc., wherein a shape of the data unit is a square having a width and length in squares of 2 greater than 8. The image data may be output to the coding unit determiner 120 according to the at least one LCU.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit is an uppermost depth and a depth of the minimum coding unit is a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. In other words, the coding unit determiner 120 determines a coded depth by encoding the image data in the deeper coding units according to depths, according to the largest coding unit of the current picture, and selecting a depth having the minimum encoding error. The determined coding depth and the image data for each LCU are output to the outputter 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one coded depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the image data is split into regions according to the depths, and the encoding errors may differ according to regions in the one largest coding unit, and thus the coded depths may differ according to regions in the image data. Thus, one or more coded depths may be set in one largest coding unit, and the image data of the largest coding unit may be divided according to coding units of at least one coded depth.

Accordingly, the coding unit determiner 120 according to the embodiment may determine coding units having a tree structure included in the current largest coding unit. The 'coding units having a tree structure' according to an embodiment include coding units corresponding to a depth determined to be the coded depth, from among all deeper coding units included in the largest coding unit. A coding unit having a coded depth may be hierarchically determined according to depths in the same region of the largest coding unit, and may be independently determined in different regions. Equally, a coded depth in a current region may be independently determined from a coded depth in another region.

A maximum depth according to an embodiment is an index related to the number of splitting times from a largest coding unit to a minimum coding unit. A first maximum depth according to an embodiment may denote the total number of splitting times from the largest coding unit to the minimum coding unit. A second maximum depth according to an embodiment may denote the total number of depth levels from the largest coding unit to the minimum coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the minimum coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and frequency transformation may be performed according to the largest coding unit. The prediction encoding and the frequency transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the frequency transformation, is performed on all of the deeper coding units generated as the depth deepens. For convenience of description, the prediction encoding and the frequency transformation will now be described based on a coding unit of a current depth, in a largest coding unit.

The video encoding apparatus 100 according to the embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the largest coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary shapes, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an embodiment may perform not only the frequency transformation on the image data in a coding unit based not only on the coding unit for encoding the image data, but also may perform the frequency transformation on the image data based on a data unit that is different from the coding unit.

In order to perform the frequency transformation in the coding unit, the frequency transformation may be performed based on a data unit having a size equal to or less than the size of the coding unit. For example, the data unit for the frequency transformation may include a data unit for an intra mode and a data unit for an inter mode.

A data unit used as a base of the frequency transformation is referred to as a 'transformation unit'. Similarly to the coding unit, the transformation unit in the coding unit may be recursively split into smaller sized regions, so that the transformation unit may be determined independently in units of regions. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction encoding and transformation. Accordingly, the coding unit determiner 120 not only determines a coded depth having a minimum encoding error but also determines a partition type in which a prediction unit is split to partitions, a prediction mode according to prediction units, and a size of a transformation unit for frequency transformation.

Coding units according to a tree structure in a largest coding unit and a method of determining a partition according to embodiments will be described in detail below with reference to FIGS. 3 through 12.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one coded depth determined by the coding unit determiner 120, and encoding mode information according to depths.

The encoded image data may be obtained by encoding residual data of an image.

The encoding mode information according to depths may include coded depth information, partition type information of a prediction unit, prediction mode information, and transformation unit size information.

Coded depth information may be defined by using split information according to depths, which specifies whether encoding is performed on coding units of a lower depth instead of a current depth. If the current depth of the current coding unit is a coded depth, the current coding unit is encoded, and thus the split information may be defined not to split the current coding unit to a lower depth. On the contrary, if the current depth of the current coding unit is not the coded depth, the encoding has to be performed on the coding unit of the lower depth, and thus the split information of the current depth may be defined to split the current coding unit to the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and information about at least one encoding mode is determined for a coding unit of a coded depth, information about at least one encoding mode may be determined for one largest coding unit. Also, a coded depth of the image data of the largest coding unit may be different according to locations since the image data is hierarchically split according to depths, and thus information about the coded depth and the encoding mode may be set for the image data.

Accordingly, the output unit 130 according to the embodiment may assign encoding information about a corresponding coded depth and an encoding mode to at least one of the coding unit, the prediction unit, and a minimum unit included in the largest coding unit.

The minimum unit according to an embodiment is a square-shaped data unit obtained by splitting the smallest coding unit constituting the lowermost depth by 4. Alternatively, the minimum unit may be a maximum square-shaped data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode. Also, information about a maximum size of the coding unit defined according to pictures, slices, or GOPs, and information about a maximum depth may be inserted into a header of a bitstream.

According to the simplest embodiment of the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined in consideration of characteristics of the current picture. Also, since encoding may be performed on each largest coding unit by using any one of various prediction modes and frequency transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

Figure 2:
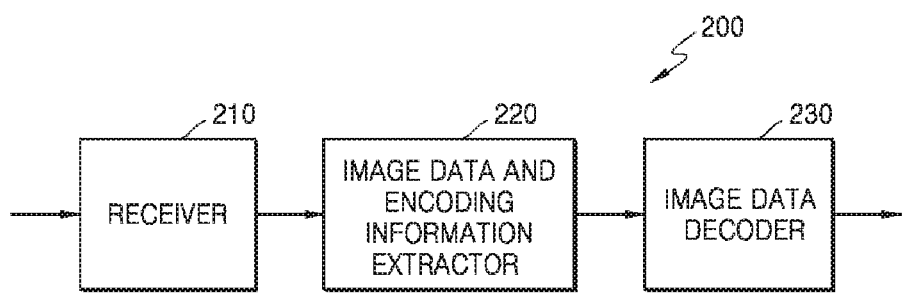
FIG. 2 is a block diagram of a video decoding apparatus according to an embodiment of the present disclosure.

FIG. 2 is a block diagram of a video decoding apparatus according to an embodiment of the present disclosure.

The video decoding apparatus 200 according to an embodiment includes a receiver 210, an image data and encoding information extractor 220, and an image data decoder 230. Definitions of various terms, such as a coding unit, a depth, a prediction unit, a transformation unit, and information about various encoding modes, for various processing by the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture.

Also, the image data and encoding information extractor 220 extracts a coded depth and encoding mode information for the coding units having a tree structure according to each largest coding unit, from the parsed bitstream. The extracted coded depth and encoding mode information are output to the image data decoder 230. That is, the image data in a bit stream is split into the largest coding unit so that the image data decoder 230 decodes the image data for each largest coding unit.

Information about a coded depth and a coding mode for each largest coding unit may be set with respect to one or more pieces of coded depth information. Information about a coding mode for each coded depth may include partition type information of a coding unit, prediction mode information, size information of a transformation unit, etc. Also, split information according to depths may be extracted as the information about a coded depth.

The information about the coded depth and the coding mode for each largest coding unit extracted by the image data and encoding information extractor 220 is, like the video encoding apparatus 100 according to an embodiment, information about the coded depth and the coding mode determined to generate a minimum coding error by repeatedly performing encoding for each coding unit according to each largest coding unit for each depth in an encoding end. Accordingly, the video decoding apparatus 200 may reconstruct an image by decoding data according to an encoding method that generates the minimum encoding error.

Coding information about a coded depth and an encoding mode according to an embodiment may be assigned to a predetermined data unit among a coding unit, a prediction unit, and a smallest unit, and thus the image data and encoding information extractor 220 may extract information about a coded depth and an encoding mode according to a predetermined data unit. When coded depth and encoding mode information of a corresponding largest coding unit is assigned to each of predetermined data units, the predetermined data units to which the same coded depth and encoding mode information is assigned may be inferred to be the data units included in the same largest coding unit.

The image data decoder 230 reconstructs a current picture by decoding image data of each largest coding unit based on the information about the coded depth and the encoding mode according to each largest coding unit. That is, the image data decoder 230 may decode the encoded image data, based on a read partition mode, a prediction type, and a transformation unit for each coding unit from among the coding units having the tree structure included in each largest coding unit. A decoding operation may include prediction including intra prediction and motion compensation, and inverse transformation.

The image data decoder 230 may perform intra prediction or motion compensation according to a partition and a prediction mode of each coding unit, based on the partition mode information and the prediction type information about the prediction unit of the coding unit according to coded depths.

Also, the image data decoder 230 may perform frequency inverse transformation according to each transformation unit for each coding unit based on size information of a transformation unit of a coding unit for each coded depth in order to perform frequency inverse transformation according to each largest coding unit.

The image data decoder 230 may determine a coded depth of a current largest coding unit by using split information according to depths. If the split information indicates that image data is no longer split in the current depth, the current depth is a coded depth. Accordingly, the image data decoder 230 may decode the image data of the current largest coding unit by using the information about the partition mode of the prediction unit, the prediction type, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimum encoding mode information received from an encoder.

A method of determining coding units having a tree structure, a prediction unit, and a transformation unit, according to an embodiment of the present disclosure, will now be described with reference to FIGS. 3 through 13.

Figure 3:
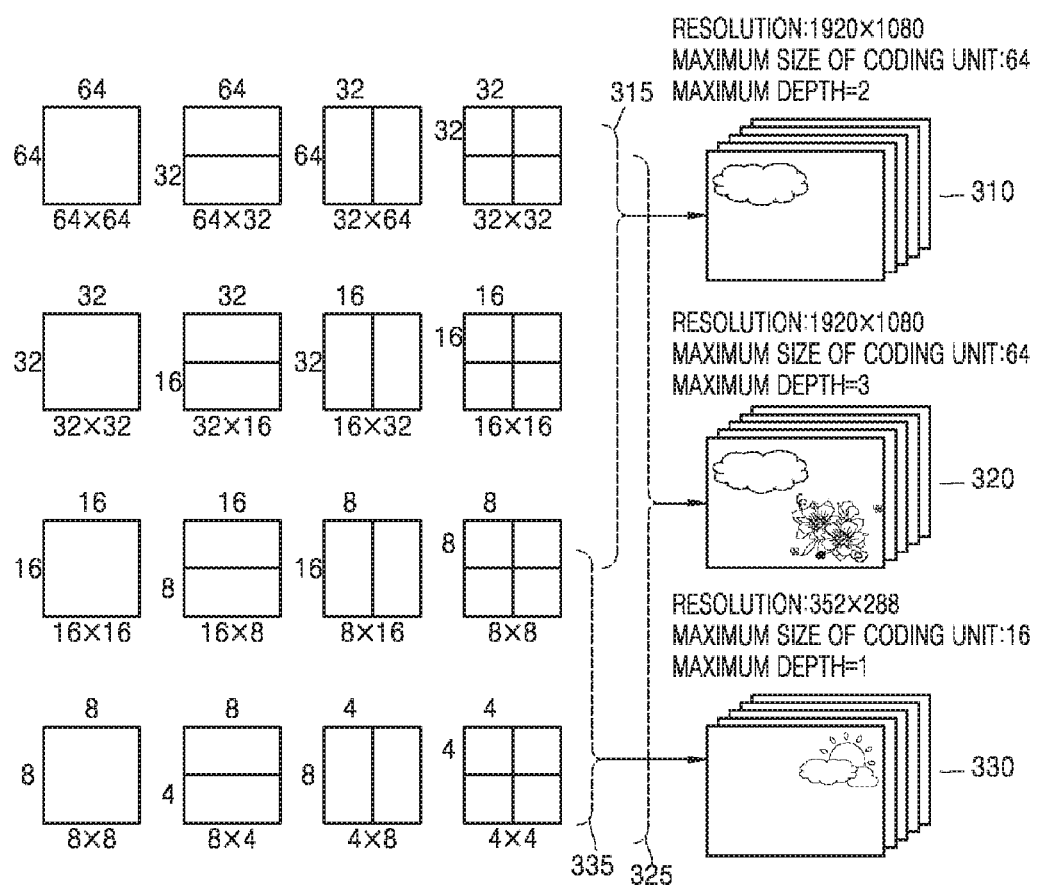
FIG. 3 is a diagram for describing a concept of coding units according to an embodiment of the present disclosure.

FIG. 3 illustrates a concept of hierarchical coding units.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. Since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 4:
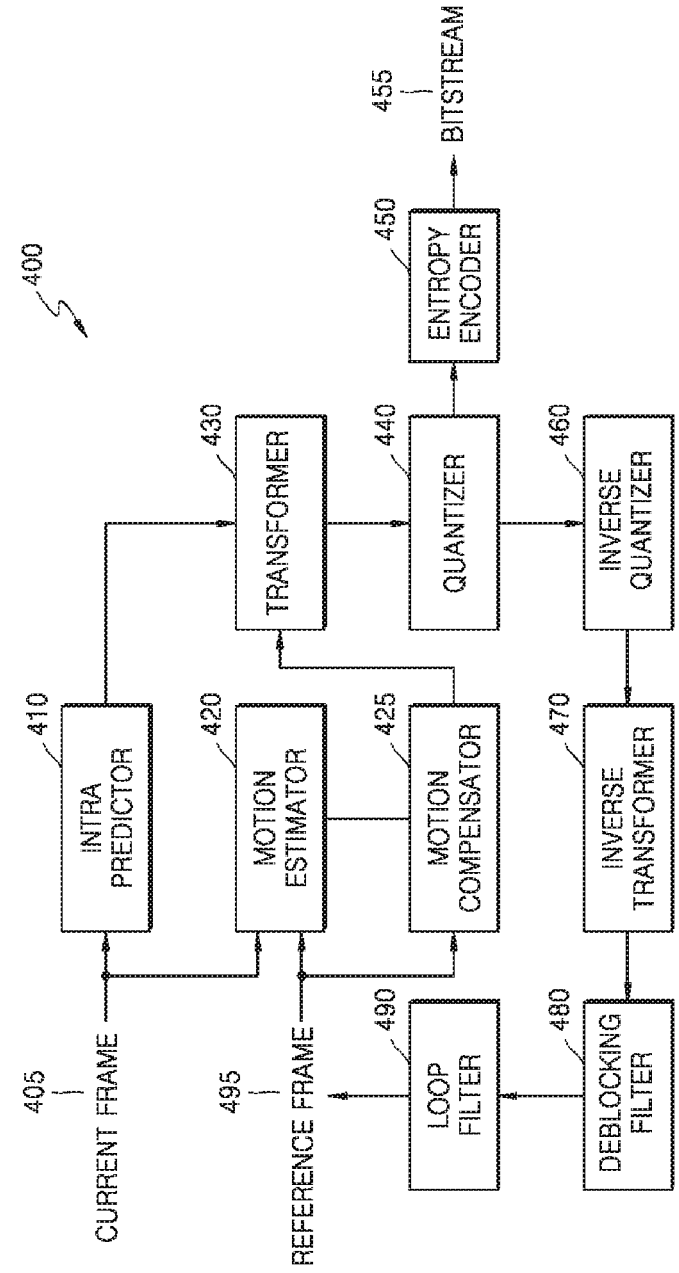
FIG. 4 is a block diagram of an image encoder based on coding units, according to an embodiment of the present disclosure.

FIG. 4 is a block diagram of an image decoder based on coding units, according to an embodiment of the present disclosure.

The image encoder 400 according to an embodiment includes operations of the coding unit determiner 120 of the video encoding apparatus 100 so as to encode image data. That is, an intra predictor 410 performs intra prediction on coding units in an intra mode, with respect to a current frame 405, and a motion estimator 420 and a motion compensator 425 respectively perform inter estimation and motion compensation on coding units in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is reconstructed as data in a spatial domain through an inverse quantizer 460 and an inverse transformer 470, and the reconstructed data in the spatial domain is output as the reference frame 495 after being post-processed through a deblocking filter 480 and a loop filter 490. The quantized transformation coefficient may be output as a bitstream 455 through an entropy encoder 450.

In order for the video encoder 400 to be applied in the video encoding apparatus 100, all elements of the video encoder 400, i.e., the intra predictor 410, the motion estimator 420, the motion compensator 425, the frequency transformer 430, the quantizer 440, the entropy encoder 450, the inverse quantizer 460, the frequency inverse transformer 470, the deblocking filter 480, and the loop filter 490, have to perform operations based on each coding unit from among coding units having a tree structure while considering the maximum depth of each largest coding unit.

Specifically, the intra predictor 410, the motion estimator 420, and the motion compensator 425 determine partitions and a prediction mode of each coding unit from among the coding units having a tree structure while considering the maximum size and the maximum depth of a current largest coding unit, and the frequency transformer 430 determines the size of the transformation unit in each coding unit from among the coding units having a tree structure.

Figure 5:
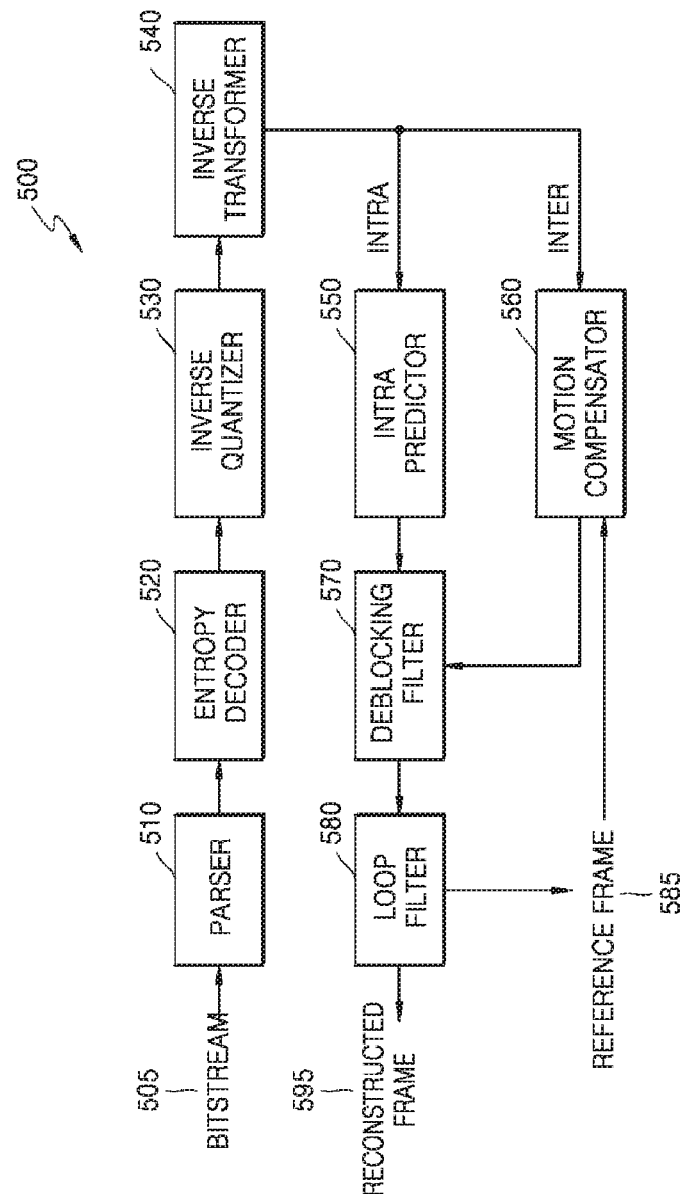
FIG. 5 is a block diagram of an image decoder based on coding units, according to an embodiment of the present disclosure.

FIG. 5 is a block diagram of an image decoder based on coding units, according to an embodiment of the present disclosure.

Encoded image data that is a decoding target and information about encoding necessary for decoding are parsed by a parse 510 from a bitstream 505. The encoded image data is output as inversely quantized data through an entropy decoder 520 and an inverse quantizer 530 and image data of a spatial region is reconstructed through a frequency inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which has passed through the intra predictor 550 and the motion compensator 560, may be output as a reconstructed frame 595 after being post-processed through a deblocking filter 570 and a loop filter 580. Also, the image data, which is post-processed through the deblocking filter 570 and the loop filter 580, may be output as the reference frame 585.

In order the image data decoder 230 of the video decoding apparatus 200 to decode the image data, jobs after the parser 510 of the image decoder 500 according to an embodiment may be performed.

In order for the video decoder 500 to be applied in the video decoding apparatus 200, all elements of the video decoder 500, i.e., the parser 510, the entropy decoder 520, the inverse quantizer 530, the frequency inverse transformer 540, the intra predictor 550, the motion compensator 560, the deblocking filter 570, and the loop filter 580, perform operations based on coding units having a tree structure for each largest coding unit.

Specifically, the intra predictor 550 and the motion compensator 560 determine a partition and a prediction mode for each coding unit having a tree structure, and the frequency inverse transformer 540 has to determine a size of a transformation unit for each coding unit.

Figure 6:
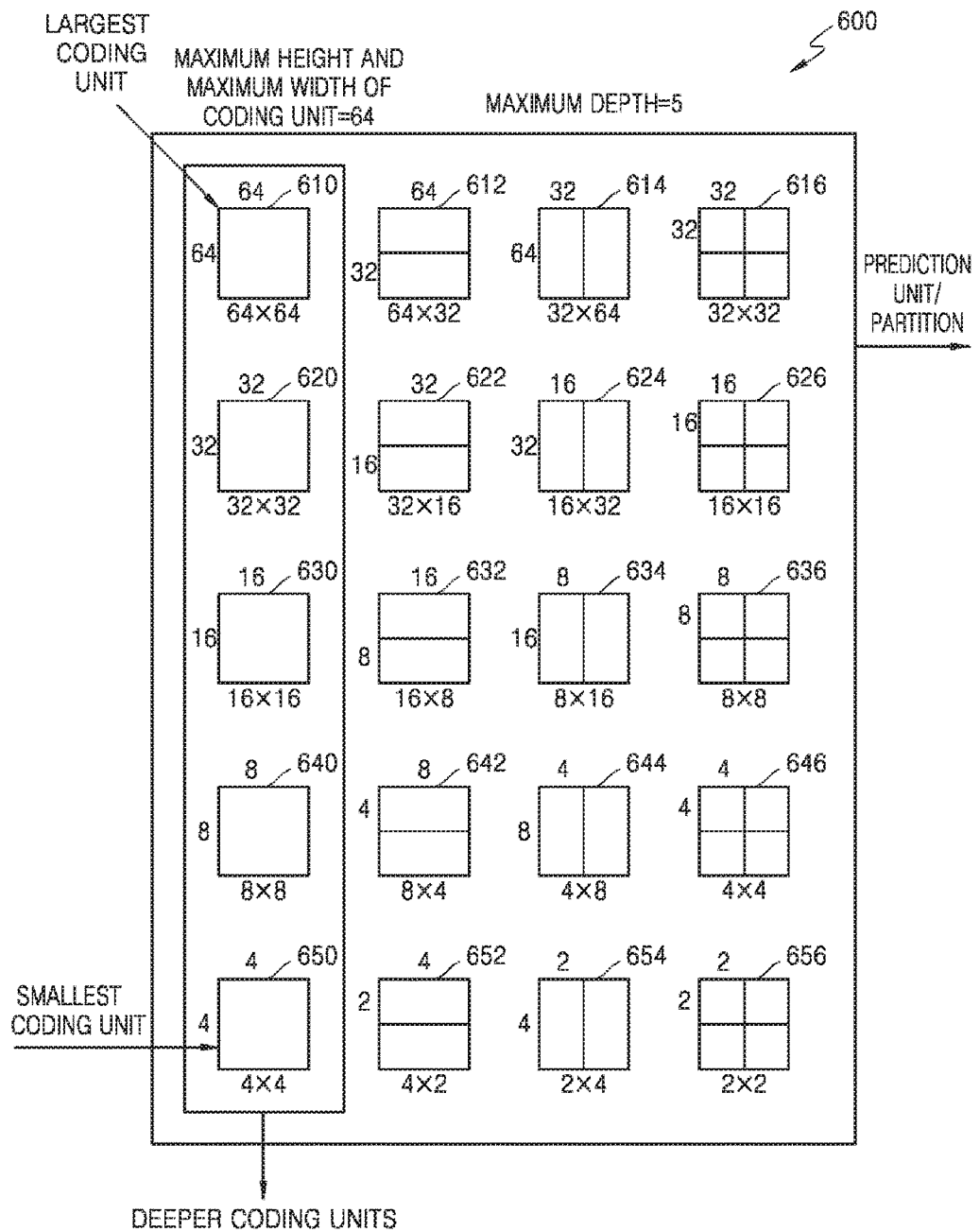
FIG. 6 is a diagram illustrating deeper coding units according to depths, and partitions, according to an embodiment of the present disclosure.

FIG. 6 is a diagram illustrating deeper coding units according to depths, and partitions, according to an embodiment of the present disclosure.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 4. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure 600.

That is, a coding unit 610 is a largest coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a smallest coding unit.

The prediction unit and the partitions of a coding unit are arranged along the horizontal axis according to each depth.

In other words, if the coding unit 610 having a size of 64×64 and a depth of 0 is a prediction unit, the prediction unit may be split into partitions included in the coding unit 610 having a size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having a size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having a size of 16×16, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having a size of 8×8, i.e. a partition 640 having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the smallest coding unit and a coding unit of the lowermost depth. A prediction unit of the coding unit 650 is only assigned to a partition having a size of 4×4.

In order to determine a coded depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the largest coding unit 610 may be selected as the coded depth and a partition type of the largest coding unit 610.

Figure 7:
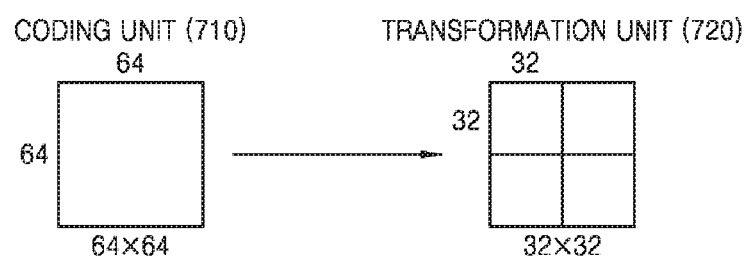
FIG. 7 is a diagram for describing a relationship between a coding unit and transformation units, according to an embodiment of the present disclosure.

FIG. 7 is a diagram for describing a relationship between a coding unit and transformation units, according to an embodiment of the present disclosure.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for frequency transformation during encoding may be selected based on data units that are not larger than a corresponding coding unit.

For example, in the video encoding apparatus 100 or the video decoding apparatus 200, when a size of the coding unit 710 is 64×64, frequency transformation may be performed by using the transformation units 720 having a size of 32×32.

Also, data of the coding unit 710 having the size of 64×64 may be encoded by performing the frequency transformation on each of the transformation units having the size of 32×32, 16×16, 8×8, and 4×4, which are smaller than 64×64, and then a transformation unit having the minimum coding error with respect to an original image may be selected.

Figure 8:
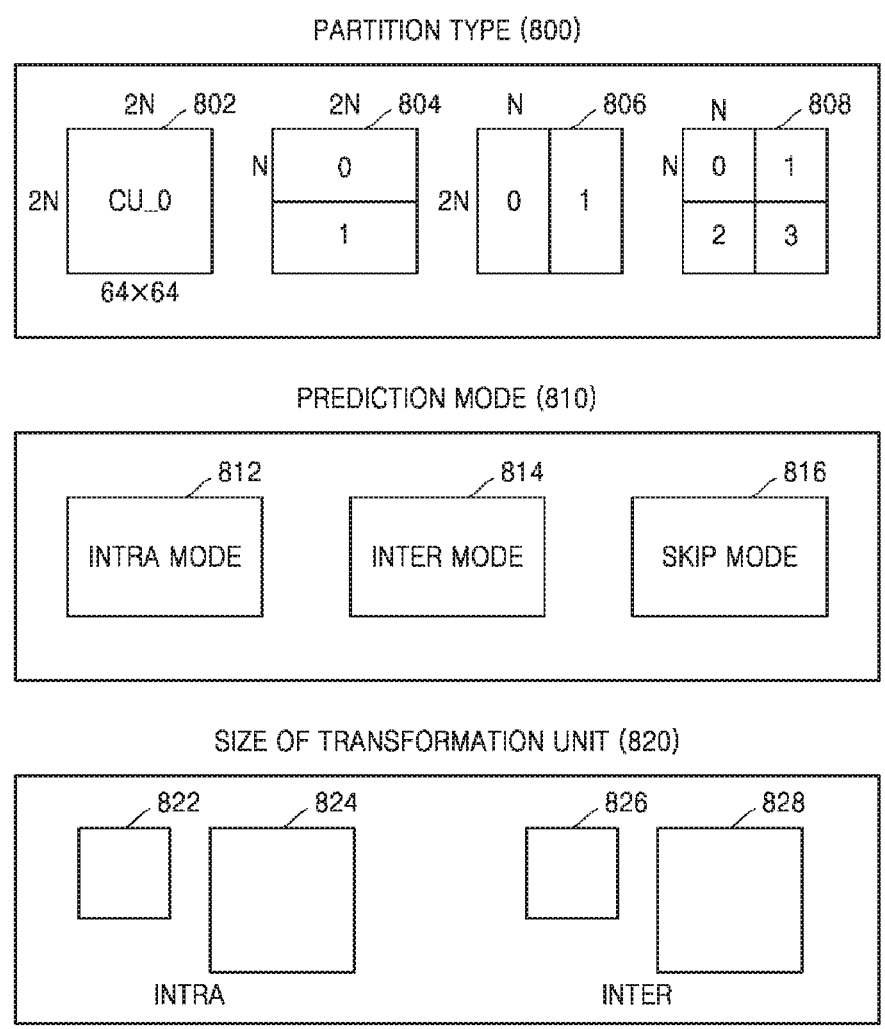
FIG. 8 illustrates a plurality of pieces of encoding information according to depths, according to an embodiment of the present disclosure.

FIG. 8 illustrates a plurality of pieces of encoding information according to an embodiment of the present disclosure.

An output unit 130 of the video encoding apparatus 100 may encode and transmit partition type information 800, prediction mode information 810, and transformation unit size information 820 for each coding unit corresponding to a coded depth, as the encoding mode information.

The partition type information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition type information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction type information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when frequency transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the partition mode information 800, the prediction type information 810, and the transformation unit size information 820 for each deeper coding unit.

Figure 9:
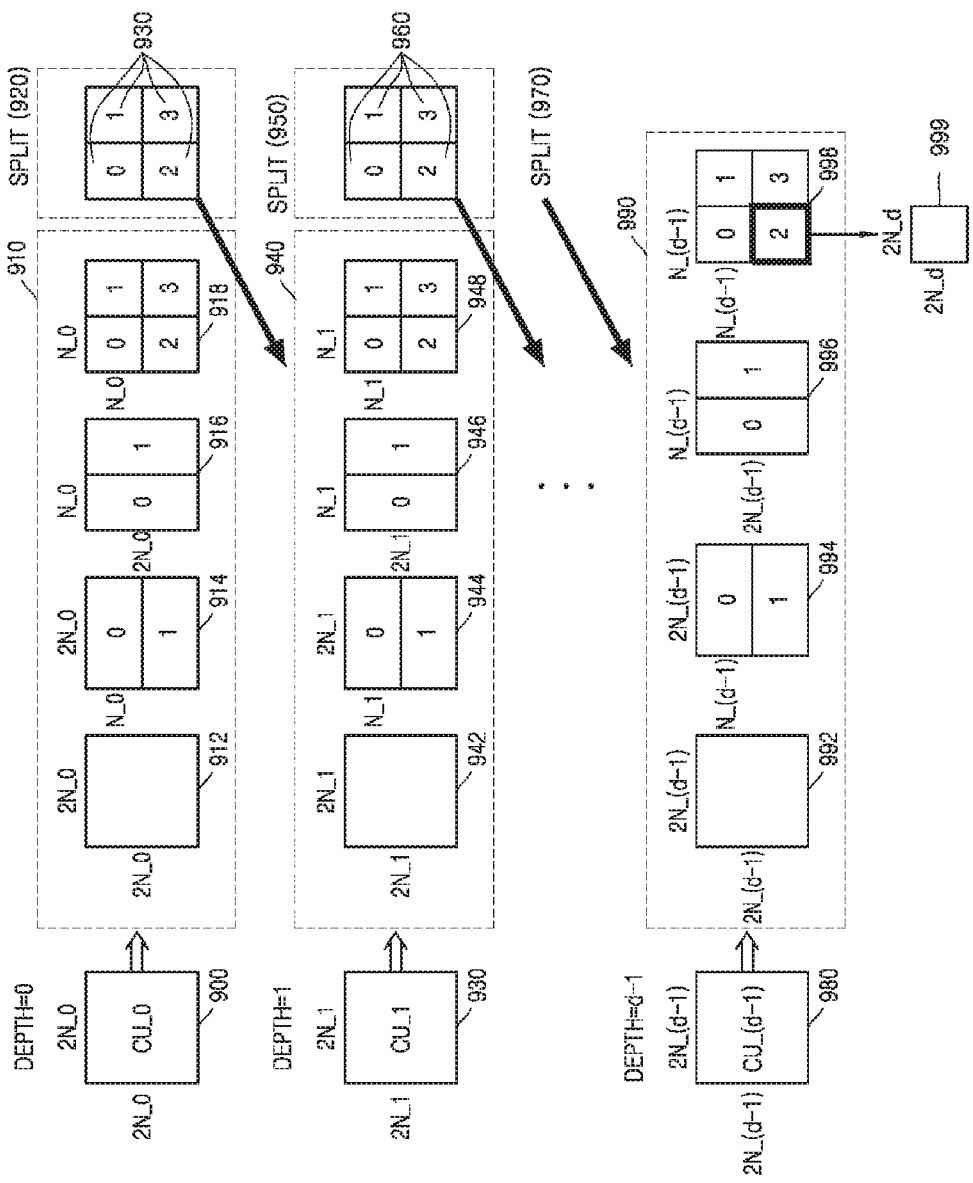
FIG. 9 is a diagram of deeper coding units according to depths, according to an embodiment of the present disclosure.

FIG. 9 is a diagram of deeper coding units according to depths, according to an embodiment of the present disclosure.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. Only the partitions 912, 914, 916, and 918 which are obtained by symmetrically splitting the prediction unit are illustrated, but as described above, a partition type is not limited thereto and may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912, 914, and 916 having the sizes of 2N_0×2N_0, 2N_0×N_0 and N_0×2N_0, the prediction unit 910 may not be split into a lower depth.

If the encoding error is the smallest in the partition type 918 having the size of N_0×N_0, a depth is changed from 0 to 1 and split is performed (operation 920), and encoding may be repeatedly performed on coding units 930 of a partition type having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, split information according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a coded depth for the coding units constituting a current largest coding unit 900 is determined to be d−1 and a partition type of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost coded depth by 4. By performing the encoding repeatedly, the video encoding apparatus 100 according to the embodiment may select a coded depth having the minimum encoding error by comparing encoding errors according to depths of the coding unit 900 to determine a depth, and set a corresponding partition type and a prediction mode as an encoding mode of the coded depth.

As such, the minimum encoding errors according to depths are compared in all of the depths of 0, 1, . . . , d−1, d, and a depth having a minimum encoding error may be determined as a coded depth. The coded depth, the partition type of the prediction unit, and the prediction mode may be encoded and transmitted as information about an encoding mode. The coded depth, the partition type of the prediction unit, and the prediction mode may be encoded and transmitted as information about an encoding mode.

The image data and encoding information extractor 220 of the video decoding apparatus 200 according to the embodiment may extract and use a coded depth and prediction unit information about the coding unit 900 so as to decode the coding unit 912. The video decoding apparatus 200 may determine a depth, in which split information is 0, as a coded depth by using split information according to depths, and use information about an encoding mode of the corresponding depth for decoding.

Figure 10:
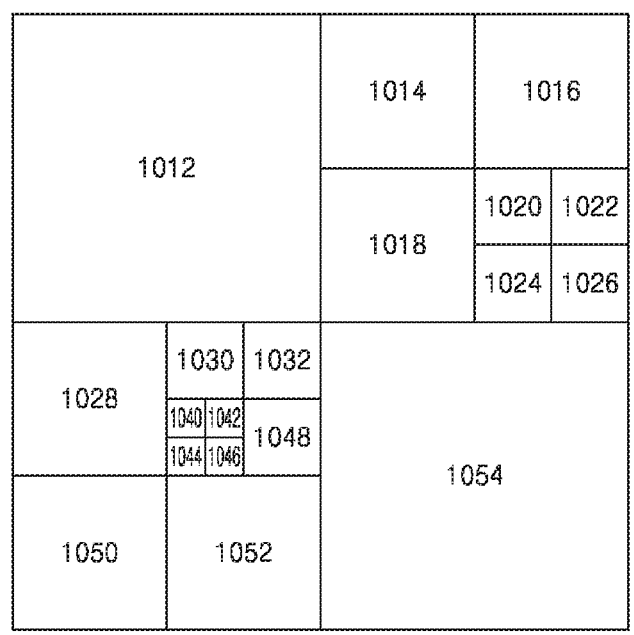
FIGS. 10, 11, and 12 are diagrams for describing a relationship between coding units, prediction units, and frequency transformation units, according to an embodiment of the present disclosure.
Figure 11:
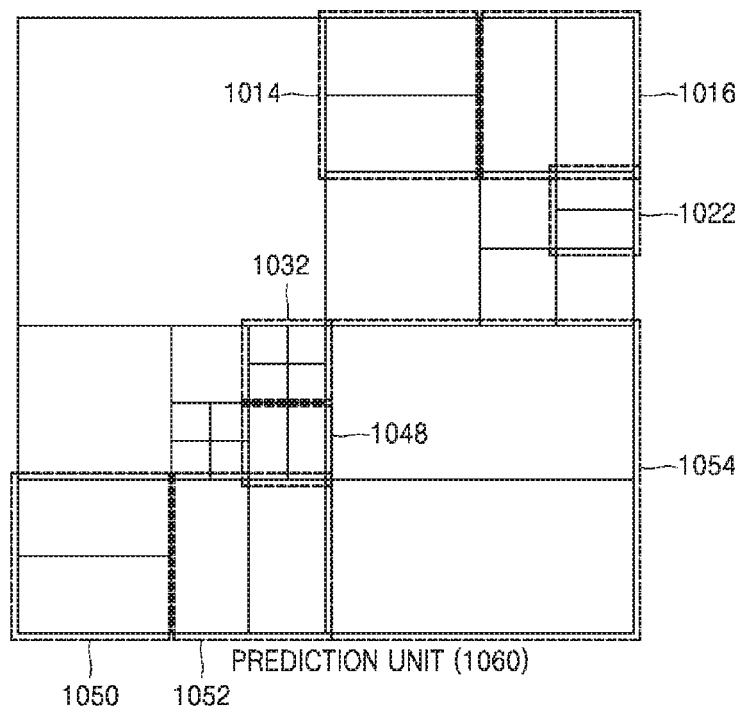
Figure 12:
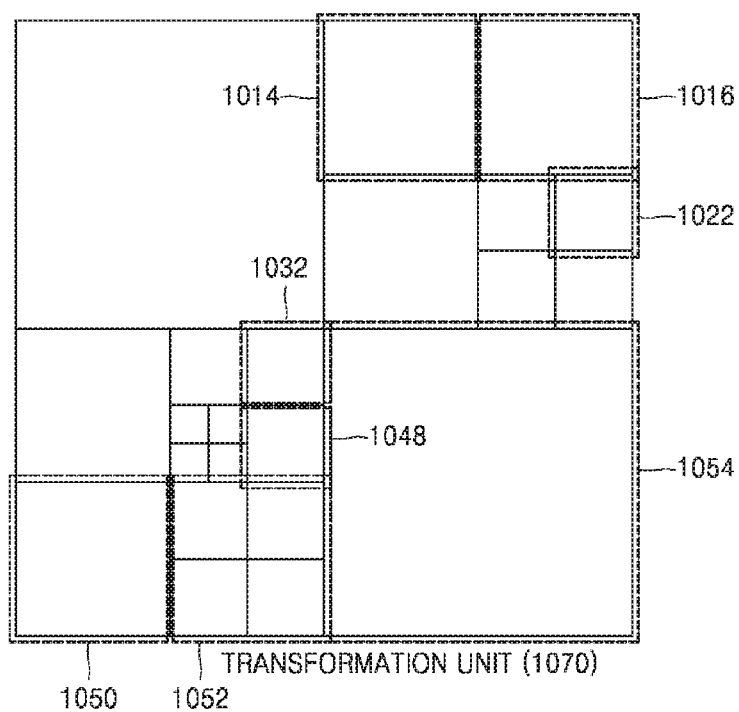

FIGS. 10, 11, and 12 are diagrams for describing a relationship between coding units, prediction units, and frequency transformation units, according to an embodiment of the present disclosure.

Coding units 1010 are deeper coding units according to coded depths determined by the video encoding apparatus 100, in a largest coding unit. Prediction units 1060 are partitions of prediction units of each of the coding units 1010 according to coded depths, and transformation units 1070 are transformation units of each of the coding units according to coded depths.

When a depth of a largest coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. That is, partitions 1014, 1022, 1050, and 1054 are a partition type having a size of 2N×N, partitions 1016, 1048, and 1052 are a partition type having a size of N×2N, and a partition 1032 is a partition type having a size of N×N. Prediction units and partitions of the coding units 1010 are smaller than or equal to each coding unit.

Frequency transformation or frequency inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/ and frequency transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition type information, prediction mode information, and transformation unit size information. Table 1 below shows the encoding information that may be set by the video encoding apparatus 100 and the video decoding apparatus 200 according to the embodiments.

formation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to the embodiment may be assigned to at least one of a coding unit corresponding to a coded depth, a prediction unit, and a minimum unit. The coding

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type 2N × 2N 2N × N N × 2N N × N | Asymmetrical Partition Type 2N × nU 2N × nD nL × 2N nR × 2N | Split Information 0 of Transformation Unit 2N × 2N | Split Information 1 of Transformation Unit N × N (Symmetrical Partition Type) N/2 × N/2 (Asymmetrical Partition Type) | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a coded depth, and thus partition type information, prediction mode information, and transformation unit size information may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transunit corresponding to the coded depth may include at least one of a prediction unit and a minimum unit containing the same encoding information.

Accordingly, it is determined whether adjacent data units are included in the coding unit corresponding to the same coded depth by comparing a plurality of pieces of encoding information of the adjacent data units. Also, a corresponding coding unit corresponding to a coded depth is determined by using encoding information of a data unit, and thus a distribution of coded depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 13:
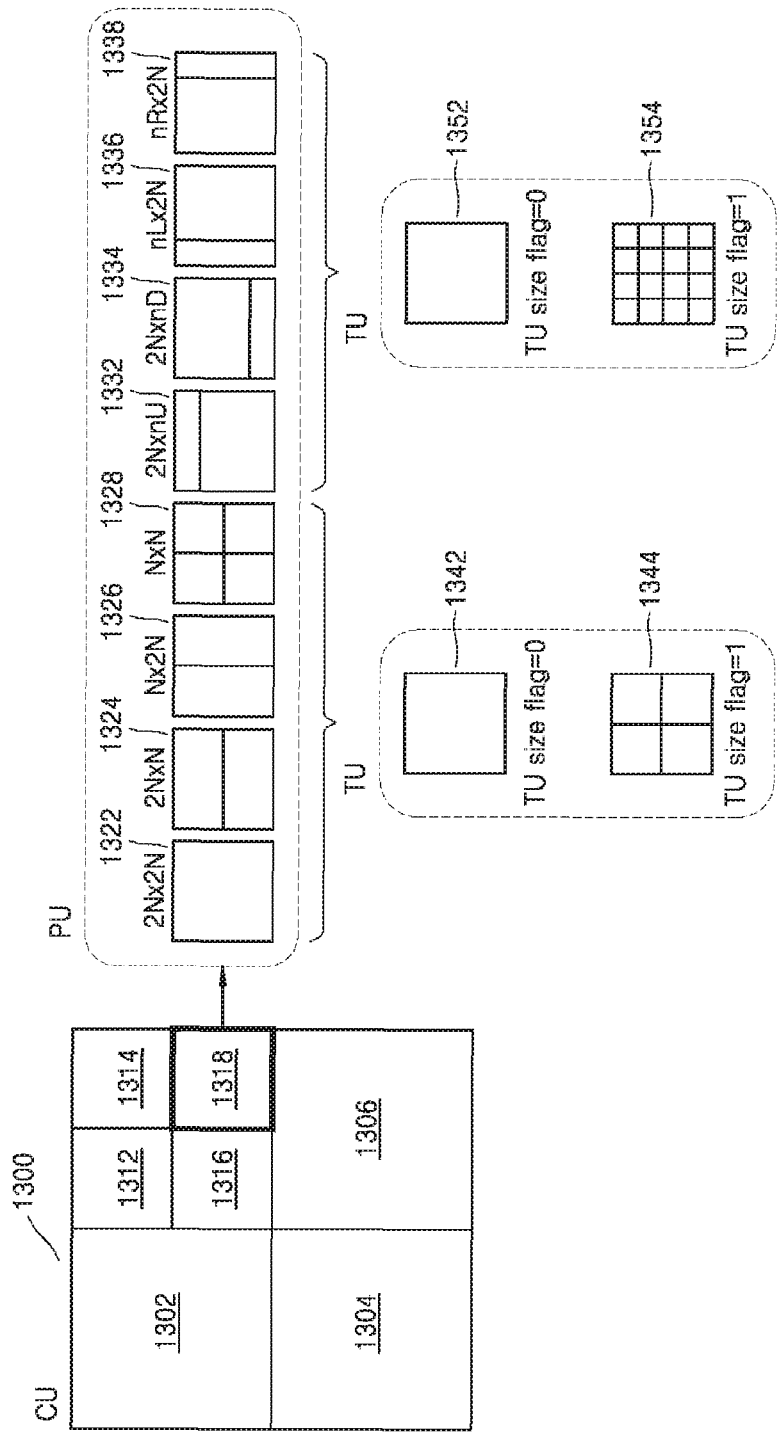
FIG. 13 is a diagram for describing a relationship between a coding unit, a prediction unit, and a transformation unit, according to encoding mode information of Table 1.

FIG. 13 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of coded depths. Here, since the coding unit 1318 is a coding unit of a coded depth, split information may be set to 0. Partition type information of the coding unit 1318 having a size of 2N×2N may be set to be one of partition types including 2N×2N 1322, 2N×N 1324, N×2N 1326, N×N 1328, 2N×nU 1332, 2N×nD 1334, nL×2N 1336, and nR×2N 1338.

When the partition type information is set to be one of symmetrical partition types 2N×2N 1322, 2N×N 1324, N×2N 1326, and N×N 1328, if the transformation unit split information (TU size flag) is 0, a transformation unit 1342 having a size of 2N×2N may be set, and if the transformation unit split information is 1, a transformation unit 1344 having a size of N×N may be set.

When the partition type information is set to be one of asymmetrical partition types 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

Hereinafter, entropy encoding and decoding processes performed by the entropy encoder 450 of the image encoding apparatus 400 according to an embodiment of FIG. 4 and the entropy decoder 520 of the image decoding apparatus 500 of FIG. 5 will be described in detail.

As described above, the image encoding apparatus 400 according to an embodiment of the present disclosure performs encoding by using a coding unit hierarchically split from a largest coding unit. The entropy encoder 450 entropy encodes a plurality of pieces of encoding information generated during the encoding process, for example, syntax elements such as a quantized transformation coefficient, a prediction mode of a prediction unit, a quantization parameter, a motion vector, etc. As an entropy encoding technique, context-based binary arithmetic coding (hereinafter referred to as "CABAC") may be used.

Table 2 is an example of syntax elements entropy encoded through CABAC in high efficiency video coding (HEVC) and H.264/AVC. Semantics of each of the syntax elements are described in HEVC and H.264/AVC, and thus detailed descriptions thereof will be omitted.

The bins output by the binarizer 1410 are arithmetic coded by the regular coding engine 1432 or the bypass coding engine 1434. When the bins binarized from the syntax elements are uniformly distributed, i.e. when data has the same frequency of 0 and 1, the binarized bins are encoded by being output to the bypass coding engine 1434 that does not use a probability value. Whether to arithmetic code current bins by using a coding engine between the regular coding engine 1432 and the bypass coding engine 1434 may be previously determined according to the types of the syntax elements.

The regular coding engine 1432 may perform arithmetic coding on the bins based on a probability model determined by the context modeler 1420. The context modeler 1420 provides the probability model with regard to the bins to the regular coding engine 1432. Specifically, the context modeler 1420 determines a probability of a predetermined binary value based on a previously encoded bin, updates the probability of the binary value used to encode the previous bin, and outputs the updated probability to the regular coding engine 1432. Conventionally, one context model is determined by using a context index ctxIdx, and an occurrence probability of a least probable symbol (LPS) or a most probable symbol (MPS) of the determined context model and information about which binary value between 0 and 1 corresponds to the MPS. Meanwhile, the context modeler 1420 according to an embodiment of the present disclosure determines a previously determined binary value, for

TABLE 2

|  | HEVC | H.264/AVC |
| --- | --- | --- |
| Coding Tree Unit (CTU) and Coding Unit (CU) | split_cu_flag, pred_mode_flag, part_mode, cu_skip_flag | mb_type, sub_mb_type, mb_skip_flag |
| Prediction Unit (PU) | prev_intra_luma_pred_flag, mpm_idx, rem_intra_luma_pred_mode, intra_chroma_pred_mode | prev_intra4x4_pred_mode_flag, prev_intra8x8_pred_mode_flag, rem_intra4x4_pred_mode, rem_intra8x8_pred_mode, intra_chroma_pred_mode |
|  | merge_flag, merge_idx, inter_pred_idc, ref_idx_l0, ref_idx_l1, abs_mvd_greater0_flag, abs_mvd_greater1_flag, abs_mvd_minus2, mvd_sign_flag | ref_idx_l0, ref_idx_l1, mvd_l0, mvd_l1 |
| Transform Unit (TU) | rqt_root_cbf, split_transform_flag, cbf_luma, cbf_cb, cbf_cr | coded_block_flag, coede_block_pattern, significant_coeff_flag, last_significant_coeff_flag, coeff_abs_level_minus1 |

Figure 14:
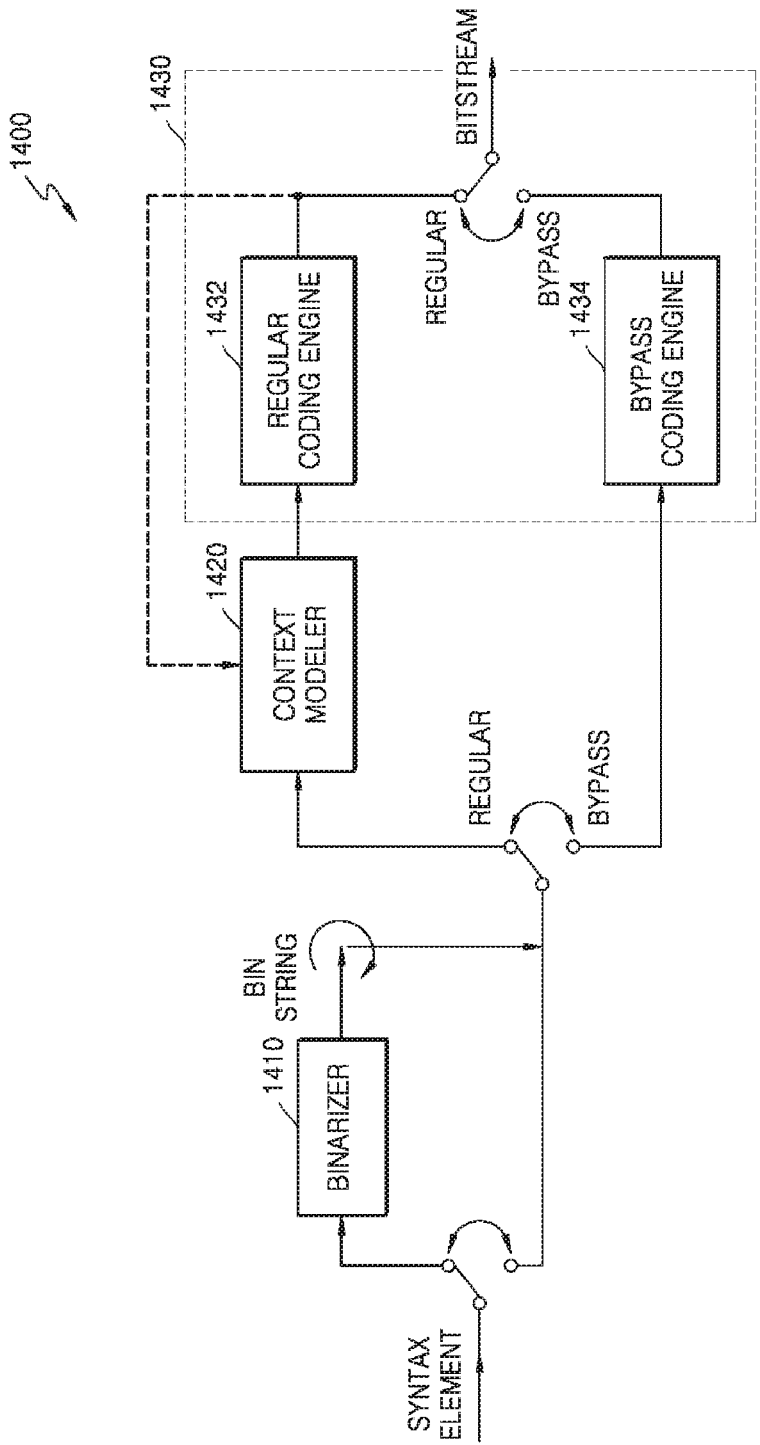
FIG. 14 is a block diagram of an entropy encoding apparatus according to an embodiment of the present disclosure.

FIG. 14 is a block diagram of an entropy encoding apparatus according to an embodiment of the present disclosure.

Referring to FIG. 14, the entropy encoding apparatus 1400 includes a binarizer 1410, a context modeler 1420, and a binary arithmetic coder 1430. Also, the binary arithmetic coder 1430 includes a regular coding engine 1432 and a bypass coding engine 1434.

The binarizer 1410 maps the input syntax elements to bins that are binary symbols. A bin indicates one bit having a value of 0 or 1 and is encoded by performing CABAC. A set of bins may be referred to as a bin string. The binarizer 1410 may apply one of fixed length binarization, truncated rice binarization, kth exp-Golomb binarization, and Golomb-rice binarization according to types of syntax elements and map and output values of the syntax elements as bins of 0 and 1.

example, P(1) indicating an occurrence probability of "1" based on the previously encoded bins without discriminating with respect to the MPS and the LPS and provides the probability of the determined predetermined binary value to the regular coding engine 1432.

The context modeler 1420 according to an embodiment of the present disclosure may obtain an autocorrelation value of each bin by using received values of the bins, determine at least one scaling factor used to update the probability of the binary value based on the autocorrelation value, and update the probability of the binary value by using the determined at least one scaling factor.

Also, the context modeler 1420 according to another embodiment of the present disclosure may obtain entropy values indicating an average bit value of the bins by applying a plurality of probability models having different scaling factors, determine a scaling factor of a probability model used to obtain a minimum entropy value among the plurality of probability models, and update the probability of the binary value by using the determined scaling factor.

The regular coding engine 1432 performs binary arithmetic coding based on a probability of a predetermined binary value provided from the context modeler 1420 and a binary value of a current bin. That is, the regular coding engine 1432 may determine the occurrence probability P(1) of "1" and the occurrence probability P(0) of "0" based on the probability of the predetermined binary value provided from the context modeler 1420, split the determined occurrence probabilities P(0) and P(1) of 0 and 1 and a range indicating a probability section according to a current bin value, and output a binary value of a representative value that belongs to the split range, thereby performing binary arithmetic coding.

Figure 15A:
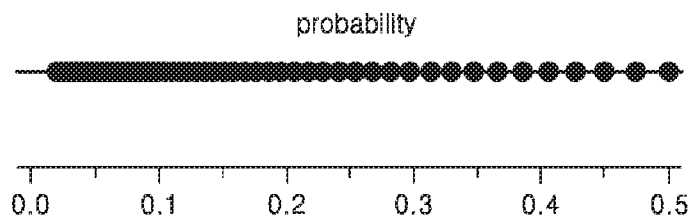
FIGS. 15A and 15B illustrate a probability update process used in context-based adaptive binary arithmetic coding (CABAC).
Figure 15B:
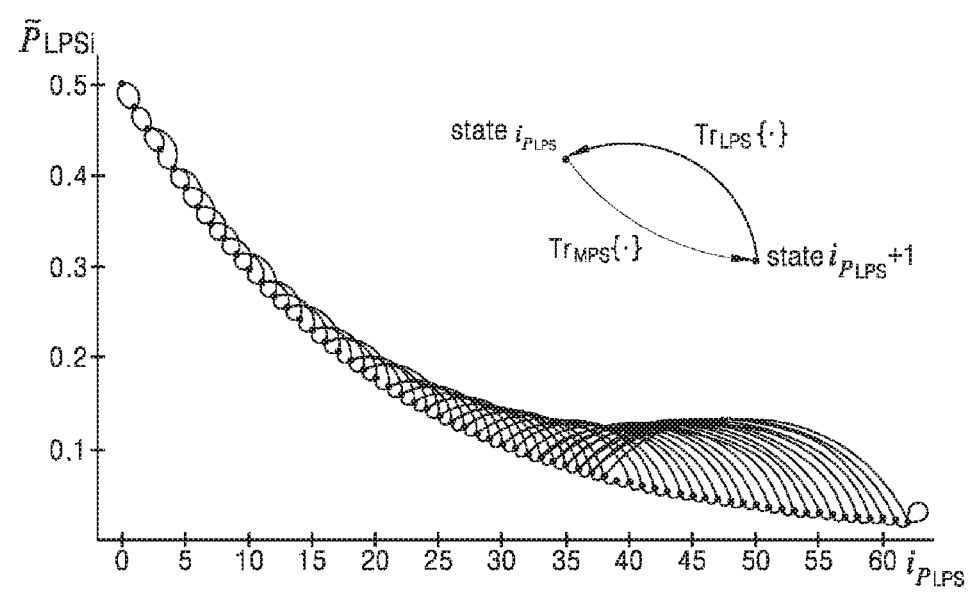

FIGS. 15A and 15B illustrate a probability update process used in CABAC.

Referring to FIG. 15A, a context model used in HEVC, etc. is defined as 64 previously determined probability states. Each probability state may be characterized by a state index $i_{PLPS}$ and a value $V_{MPS}$ of an MPS. When a probability is updated by using a previously determined state transition table, a probability state that is to be transited from a current probability state may be presented. The probability state may be changed according to whether a value of a currently arithmetic coded bin is the MPS or an LPS. For example, if a value of a current bin is the MPS, the probability state is changed from a current probability state $i_{PLPS}$ to a forward state $i_{PLPS}+1$ in which an LPS probability is reduced, and, if the value of the current bin is the LPS, the probability state is changed from the current probability state $i_{PLPS}$ to a backward state $i_{PLPS}-1$ in which the LPS probability is increased. In FIG. 15A, $Tr_{MPS}\{\ \}$ indicates a probability state transition direction after MPS processing, and $Tr_{LPS}\{\ \}$ indicates a probability state transition direction after LPS processing.

A probability changed during MPS or LPS processing has an exponentially reduced form as shown in FIG. 15A. A probability Pn of n context models may be expressed as the following equation: $Pn=0.5(1-\alpha)^n$, wherein $(1-\alpha)=(0.01875/0.5)^{1/63}$.

Referring to FIG. 15B, a probably distribution of an LPS close to 0 is dense, and a probability distribution of an LPS close to ½ is sparse. Thus, when occurrence probabilities of binary values of 0 and 1 are similar, i.e., when the occurrence probabilities of binary values of 0 and 1 are close to ½, since probabilities are sparsely distributed, a probability prediction error may be increased. Also, when a probability function of an exponentiation form is used, since a probability value close to 0 needs to be elaborately expressed, a bit depth for presenting the probability value may be increased. Thus, a size of a look-up table for storing a probability model having the probability function of the exponentiation form may be increased. Also, when a dense probability value is used to update a probability or split a probability section, a multiplication arithmetic amount increases, which may be burdensome on hardware. Thus, a probability in which a probability value is not exponentially but hierarchically reduced may be used by mapping the probability $P_{LPS}$ shown in FIG. 15A to a predetermined value through a round-off arithmetic operation.

A process for updating a probability model performed by the context modeler 1420 will be described in detail below.

A probability update process used in CABAC may be performed according to Equation 1 below.

$$p_i(t)=\alpha_i y+(1-\alpha_i)p_i(t-1) \qquad \text{[Equation 1]}$$

In Equation 1 above, $p_i(t)$ denotes an updated probability, $p_i(t-1)$ denotes a probability of a previous bin, $\alpha_i$ ($0 \le \alpha_i 1$, $\alpha_i$ is a real number) denotes a scaling factor, and y denotes a value of an input current bin. i is an integer number indicating the number of scaling factors. As the number of used scaling factors increases, accuracy of a predicted probability may increase, whereas an arithmetic complexity may increase. Thus, a case where i is 1 or 2, i.e. a probability is updated by using one scaling factor or two scaling factors will be described below. However, a probability update method according to the present disclosure may also be applied to a case where the probability is updated by using two or more scaling factors.

In a binary arithmetic coder, an arbitrary sequence of bins having values of 0 and 1 may be handled. If a probability of a bin of any one of 0 and 1 is determined as A ($0 \le A \le 1$, A is a real number), a probability of another bin may be determined as (1−A). In Equation 1 above, when the input value of the bin is 1, i.e. when y=1, since a value of $p_i(t)$ increases, $p_i(t)$ of Equation 1 indicates a probability of "1", i.e. a probability that a next bin is "1". A range of a probability value may be considered in order to determine which one of 0 and 1 is an MPS or an LPS. For example, if $p_i(t)$ indicating the probability of 1 has [½;1], i.e. a value between (½) and 1, the MPS is 1, and if $p_i(t)$ has [0;½], i.e. a value between 0 and (½), 0 corresponds to the MPS. The probably value of the LPS used in CABAC may be determined as a small value between $p_i(t)$ and $(1-p_i(t))$.

An important parameter for updating the probability based on Equation 1 is a scaling factor $\alpha_i$. According to a value of the scaling factor $\alpha_i$, a sensitiveness indicating how sensitively the probability used in CABAC is updated and a robustness regarding whether the probability used in CABAC does not react with an error may be determined.

The context modeler 1420 according to an embodiment of the present disclosure may generate one or more updated probabilities by using one or more scaling factors $\alpha_i$ and may finally determine a weight average of the one or more updated probabilities as an updated probability.

Specifically, if a plurality of probabilities $P_i(t)$ is obtained by applying the plurality of scaling factors $\alpha_i$ to Equation 1, the context modeler 1420 obtains the final update probability p(t) by calculating a weight average of the plurality of probabilities $P_i(t)$ according to the following Equation 2 below.

$$p(t) = \frac{\sum \omega_i * p_i(t)}{\sum \omega_i} \qquad \text{[Equation 2]}$$

$\omega_i$ denotes a weight applied to the plurality of probabilities $P_i(t)$. $\omega_i$ may be determined in consideration of the number of scaling factors. If the number of used scaling factors is N (N is an integer), $\omega_i=(1/N)$. As an example, when two scaling factors $\alpha_1$ and $\alpha_2$ are used, $p_1(t)=\alpha_1 y+(1-\alpha_1)p_1(t-1)$ and $p_2(t)=\alpha_2 y+(1-\alpha_2)p_2(t-1)$ are obtained based on Equation 1 above. In this case, $(p_1(t)+p_2(t))/2$ that is an average value of two probabilities $p_1(t)$ and $p_2(t)$ is determined as the updated probability p(t).

Meanwhile, in order to omit a multiplication process upon update of the probability, the scaling factor may have a value of a power of 2 as a denominator like $½^P$. That is, the plurality of scaling factors $\alpha_i$ may have a value like the following Equation $a_i=1/(2^{\wedge}M_i)$ ($M_i$ is an integer). In this case, a multiplication arithmetic operation included in Equation 1 described above may be replaced with a shift arithmetic operation as shown in Equation 3 below. In Equation 3, ">>" is a write shift arithmetic operator.

$$P_i(t)=(y \gg M_i)+P_i(t-1)-(P_i(t-1) \gg M_i) \quad \text{[Equation 3]}$$

In the described example, when it is set that $\alpha_1=\frac{1}{16}=\frac{1}{2^4}$ and $\alpha_2=\frac{1}{128}=\frac{1}{2^7}$, $p_1(t)=\alpha_1 y+(1-\alpha_1)p_1(t-1)$ may be obtained through an equation only including a shift arithmetic operation and addition and subtraction arithmetic operations like $p_1(t)=(y\gg4)+p_1(t-1)-(p_1(t-1)\gg4)$. Likewise, $p_2(t)=\alpha_2 y+(1-\alpha_2)p_2(t-1)$ may be replaced as $p_2(t)=(y\gg7)+p_2(t-1)-(p_2(t-1)\gg7)$. The shift arithmetic operation may be more easily implemented than a multiplication or division arithmetic operation in hardware or software, and thus the scaling factor may be determined as a predetermined value of a power of 2 as a denominator.

Figure 16:
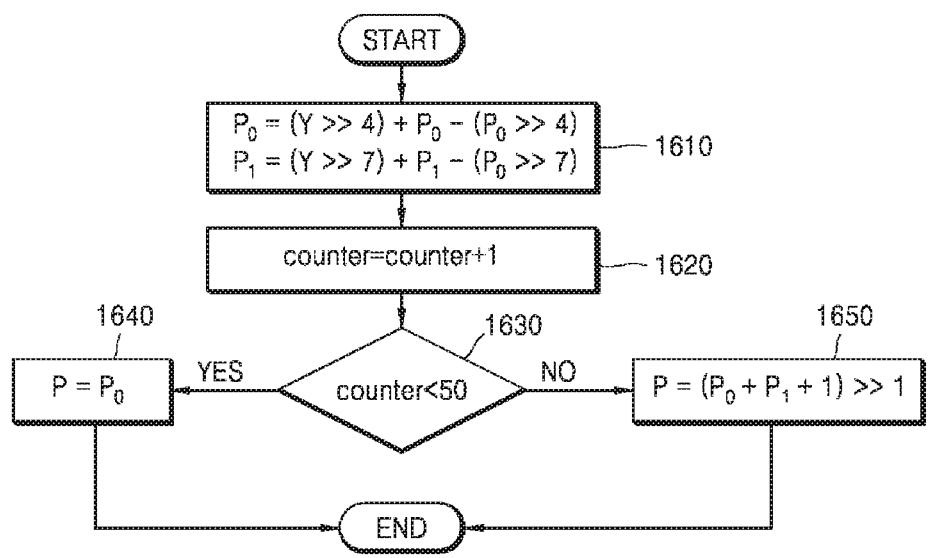
FIG. 16 is a flowchart of a probability update process according to an embodiment of the present disclosure.

FIG. 16 is a flowchart of a probability update process according to an embodiment of the present disclosure.

Referring to FIG. 16, in operation 1610, the context modeler 1420 obtains a plurality of updated probabilities by applying a plurality of scaling factors. As described in the example above, when the two scaling factors $\alpha_1=\frac{1}{16}=\frac{1}{2^4}$ and $\alpha_2=\frac{1}{128}=\frac{1}{2^7}$ are used, the context modeler 1420 obtains two updated probabilities $p_1(t)$ and $p_2(t)$ through $p_1(t)=(y\gg4)+p_1(t-1)-(p_1(t-1)\gg4)$ and $p_2(t)=(y\gg7)+p_2(t-1)-(p_2(t-1)\gg7)$ and determines $(p_1(t)+p_2(t))/2$ that is an average value of $p_1(t)$ and $p_2(t)$ as a final update probability p(t). $(p_i(t)+p_2(t))/2$ may be implemented through a shift arithmetic operation like $(p_1(t)+p_2(t))\gg1$.

During CABAC encoding and decoding processes, an entropy reset is performed in a predetermined data unit. For example, the entropy reset may be performed in a slice unit and a coding unit. The entropy reset means discarding a current probability value and newly performing CABAC based on a predetermined probability value. In a probability update process performed after such a reset process, a probability value set as an initial value is not an optimal value but is converged to a certain probability value through several update processes. When a probability is updated by using one scaling factor, a probability update results in a fast change in the probability and thus the updated probability is converged to an appropriate value fast, whereas a repetitive update causes an easy fluctuation. When the probability is updated by using a plurality of scaling factors, although the probability does not change fast, when the updated probability is converged to near an appropriate value, since a fluctuation occurs less frequently, the updated probability does not sensitively react with an error or noise and stably operates. Thus, in operation 1620, the context modeler 1420 increases a counter every probability update, and, in operation 1630, determines whether a currently updated probability relates to initial bins based on a counter value. With regard to initial bins less than a predetermined number, for example, 50 or less initial bins, in operation 1640, a probably update is performed by using a single scaling factor. With regard to bins input after the initial bins, for example, bins from a 50$^{th}$ bin, in operation 1650, a probability update process determined by using two scaling factors may be performed.

During the above described probability update process, the probability update is performed by using a scaling factor having a predetermined value, for example, a value of a power of 2 as a denominator.

The context modeler 1420 according to an embodiment of the present disclosure obtains an autocorrelation value of each bin by using values of received bins, determines at least one scaling factor used to update a probability of a binary value based on the autocorrelation value, and then updates the probability of the binary value by using the determined at least one scaling factor.

Figure 17A:
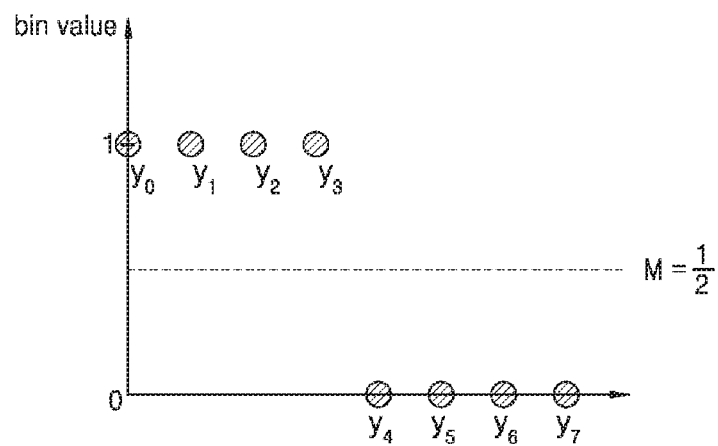
FIGS. 17A and 17B are reference diagrams for explaining autocorrelation values.
Figure 17B:
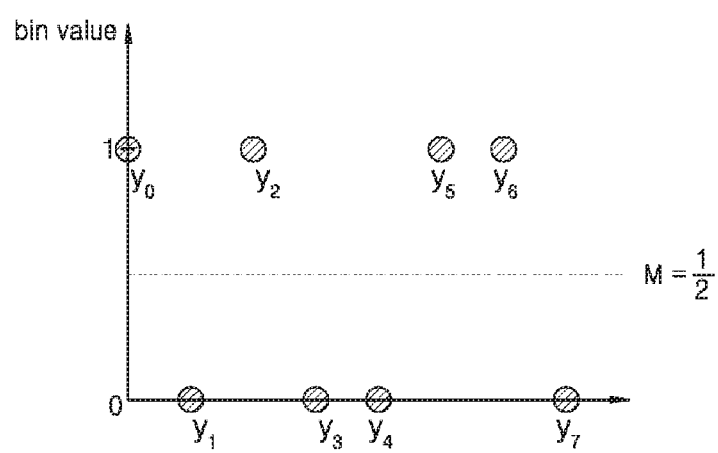

FIGS. 17A and 17B are reference diagrams for explaining autocorrelation values.

Values of bins spaced by a predetermined distance k (k is an integer), an average value M of the bins, and a variance $\sigma$ of the bins are used to obtain an autocorrelation value $R_k$ according to the predetermined distance k as shown in Equation 4 below.

$$R_k = \frac{1}{\sigma^2}\sum_{j=0}^{N}(y_j - M)(y_{j-k} - M) \quad \text{[Equation 4]}$$

In Equation 4 above, the number of bins (N+1) (N is an integer) and values of (N+1) bins are $y_j$ (j is an integer from 0 to N).

Referring to FIGS. 17A and 17B, {y0, y1, y2, . . . , y7} indicate 8 bins, and yi has a value of 0 or 1. If it is assumed that values of the bins are distributed as shown in FIGS. 17A and 17B, the average value M of the bins have a value of ½ in FIGS. 17A and 17B.

The variance $\sigma$ is an average value of mean square errors between the value yi of each bin and the average value M, and have a value of $(\frac{1}{2})^2 * 8 * (\frac{1}{8}) = \frac{1}{4}$ in FIGS. 17A and 17B.

When the predetermined distance k is 1, i.e. if the autocorrelation value is calculated by using values of adjacent bins, the autocorrelation value when the values of adjacent bins are similarly distributed as shown in FIG. 17A is greater than that when the values of adjacent bins are non-uniformly distributed as shown in FIG. 17B.

Figure 18:
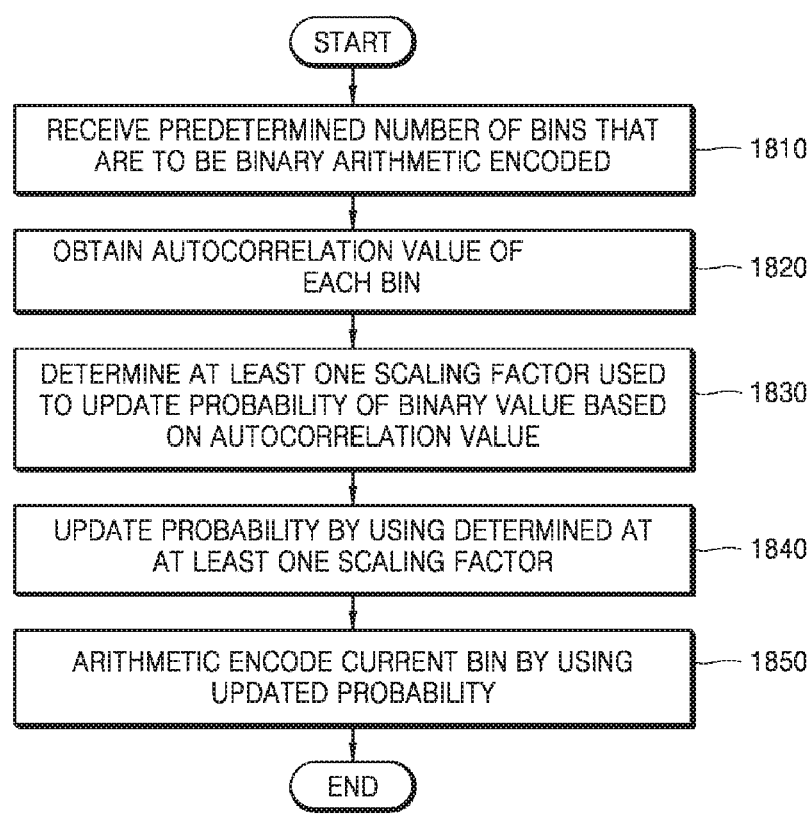
FIG. 18 is a flowchart of a probability update method for binary arithmetic coding, according to an embodiment of the present disclosure.

FIG. 18 is a flowchart of a probability update method for binary arithmetic coding, according to an embodiment of the present disclosure.

As described above, the probability update method according to an embodiment of the present disclosure calculates an autocorrelation value by using input bins and uses a value in which a mean square error between a probability of each bin determined based on the autocorrelation value and a value of each bin is minimum as a scaling factor.

In operation 1810, the context modeler 1420 receives a predetermined number of bins that are to be binary arithmetic coded through CABAC. In operation 1820, the context modeler 1420 obtains an autocorrelation value of each bin based on Equation 3 above.

In operation 1830, the context modeler 1420 determines at least one scaling factor used to update a probability of a binary value based on the autocorrelation value $R_k$.

Specifically, it is assumed that $\{y_i\}$ denotes N bins having one of values 0 and 1. That is, j has a value from 0 to (N−1).

Based on Equation 1 above, probabilities of previous bins, values of previous bins, and the scaling factor $\alpha$ are used to represent the probability $P_j$ updated after arithmetic coding of a jth bin as shown in Equation 5 below.

$$P_j = \alpha * y_j + (1-\alpha)*P_{j-1} = \alpha*y_j + (1-\alpha)* \quad \text{[Equation 5]}$$
$$(a*y_{j-1} + (1-\alpha)*P_{j-2})$$
$$= \alpha*y_j + (1-\alpha)*(a*y_{j-1} + (1-\alpha)*$$
$$(\alpha*y_{j-2} + (1-\alpha)*P_{j-3})))$$

-continued
$$= \alpha * y_j + (1-\alpha)*(a^* y_{j-1} + (1-\alpha)*$$
$$(\alpha * y_{j-2} + (1-\alpha)*(a*y_j + (1-\alpha)*$$
$$(a*y_{j-1} + (1-\alpha)*(a*y_{j-3} + (1-\alpha)*P_{j-4})))))$$
$$=$$

Equation 5 is summarized as shown in Equation 6 below.

$$P_j = \alpha\left(y_j + \sum_{k=1}^{N} y_{j-k}(1-\alpha)^k\right) + P_{j-N}\sum_{k=1}^{N}(1-\alpha)^k \quad \text{[Equation 6]}$$

A mean square error ("MSE") between a probability and a value of each bin is as shown in Equation 7 below.

$$MSE(\alpha) = \sum_{j=0}^{\infty}(y_j - p_j)^2 = \sum_{j=0}^{\infty} \quad \text{[Equation 7]}$$

$$\left(y_j - \left(\alpha\left(y_j + \sum_{k=1}^{N} y_{j-k}(1-\alpha)^k\right) + P_{j-N}\sum_{k=1}^{N}(1-\alpha)^k\right)\right)^2$$

As shown in Equation 7, the MSE has a value varying with respect to the scaling factor α. To determine the scaling factor α, a value of α that results in a minimum MSE is determined. To this end, the MSE of Equation 7 is partially differentiated with respect to α and a value that results in the MSE having 0 is determined.

That is, the scaling factor α that results in $$\frac{\partial MSE(\alpha)}{\partial \alpha}$$

having 0 is determined. If a value of the partial differentiation equation is calculated, the scaling factor α may be determined by using the autocorrelation value $R_k$ as shown in Equation 8 below.

$$\alpha = \frac{(3R_k - 1)}{2R_k} \quad \text{[Equation 8]}$$

As described above, two scaling factors $\alpha_1$ and $\alpha_2$ are used to obtain $p_{1,j}=\alpha_1 y+(1-\alpha_1)p_{1,j-1}$ and $p_{2,j}=\alpha_2 y+(1-\alpha_2)p_{2,(j-1)}$, and, when $(p_{1,j}+p_{2,j})/2$ that is an average value of two probabilities $p_{1,j}$ and $p_{2,j}$ is determined as the updated probability $p_j$, an MSE between the probability and the value of each bin is calculated by substituting $(p_{1,j}+p_{2,j})/2$ instead of $p_j$ of Equation 7 as shown in Equation 9 below.

$$MSE(\alpha) = \sum_{j=0}^{\infty}(y_j - p_j)^2 = \quad \text{[Equation 9]}$$

$$\sum_{j=0}^{\infty}\left(y_j - \frac{1}{2}(p_{1,j} + p_{2,j})\right)^2 = 1 - \frac{R_k\alpha_1}{1-\beta_1 R_k} - \frac{R_k\alpha_2}{1-\beta_2 R_k} +$$

$$\frac{1}{2}\left\{\frac{\alpha_1\alpha_2}{1-\beta_1\beta_2}\left(1 + \frac{\beta_1 R_k}{1-\beta_1 R_k} + \frac{\beta_2 R_k}{1-\beta_2 R_k}\right)\right\} +$$

$$\frac{1}{4}\left\{\frac{\alpha_1}{2-\alpha_1}\left(1 + \frac{2\beta_1 R_k}{1-\beta_1 R_k}\right) + \frac{\alpha_2}{2-\alpha_2}\left(1 + \frac{2\beta_2 R_k}{1-\beta_2 R_k}\right)\right\}$$

In Equation 9, $\beta_i = 1-\alpha_i$. That is, $\beta_1 = 1-\alpha_1$, and $\beta_2 = 1-\alpha_2$.

A minimum value is obtained according to a range of an autocorrelation value by partially differentiating Equation 9 with respect to $\alpha_1$ and $\alpha_2$ as shown below.

When
$$R_k \in [-1, 1/7], \alpha_1 = 0, \alpha_2 = 0;$$

When
$$R_k \in [1/7, 1/2], \alpha_1 = 3 - \sqrt{9 - \frac{7R_k - 1}{R_k}}, \alpha_2 = 0;$$

When
$$R_k \in [1/2, 5/7], \alpha_1 = 1, \alpha_2 = 0;$$

When
$$R_k \in [5/7, 1], \alpha_1 = 1, \alpha_2 = \frac{3R_k - 2 - \sqrt{2R_k^2 - 1}}{R_k - 1}$$

As described above, if one or more scaling factors are determined by using an autocorrelation value of bins, in operation 1840, the context modeler 1420 updates a previous probability value by using the determined scaling factor and provides the updated probability value to the regular coding engine 1432. In operation 1850, the regular coding engine 1432 performs binary arithmetic coding on a next bin by using the updated probability value.

Figure 19:
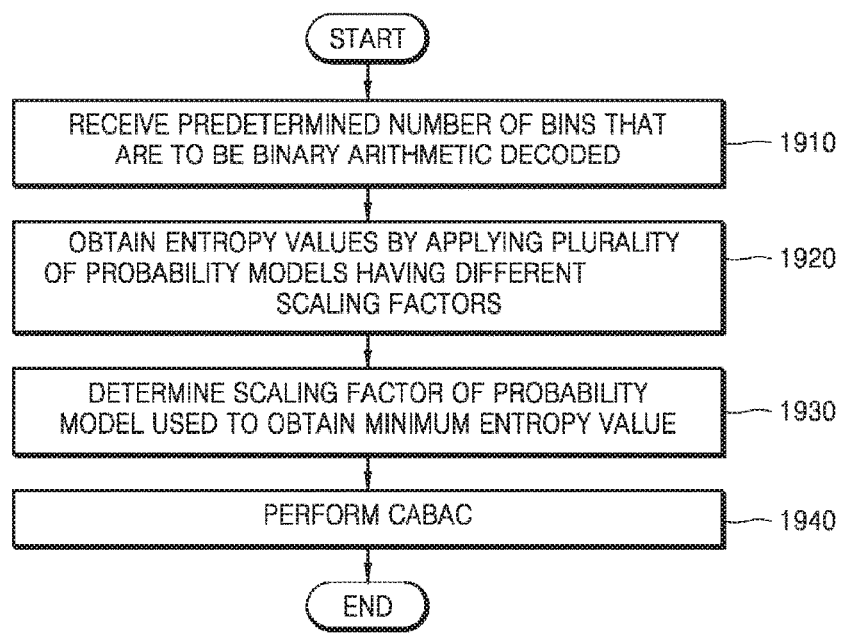
FIG. 19 is a flowchart of a probability update method used in CABAC, according to another embodiment of the present disclosure.

FIG. 19 is a flowchart of a probability update method used in CABAC, according to another embodiment of the present disclosure.

The context modeler 1420 according to another embodiment of the present disclosure may obtain entropy values indicating an average bit value necessary for coding one bin by applying a plurality of probability models having different scaling factors, determine a scaling factor having a probability model used to obtain a minimum entropy value, and perform a probability update by using the determined scaling factor.

Referring to FIG. 19, in operation 1910, the context modeler 1420 receives a predetermined number of bins that are to be binary arithmetic coded.

In operation 1920, the context modeler 1420 obtains entropy values by applying a plurality of probability models having different scaling factors to one of the received bins.

It is defined that an M probability model is $PM_i$ (i is an integer from 0 to (M−1)), and a scaling factor of the probability model $PM_i$ is $\alpha_i$. The context modeler 1420 performs a probability update with respect to a current bin by using the scaling factor $\alpha_i$ of the probability model $PM_i$. As shown in Equation 1 above, the context modeler 1420 performs the probability update according to $p_i(t)=\alpha_i y_i+(1-\alpha_i)p_i(t-1)$.

The context modeler 1420 calculates entropy by applying a plurality of probability models in a bit unit. Specifically, the context modeler 1420 obtains a parameter bit; according to a value of a current bin y as show in Equation 10 below.

$$bit_i = (y==1)?-\log_2 p_i(t):-\log_2(1-p_i(t)) \quad \text{[Equation 10]}$$

Referring to FIG. 10, the parameter bit; has a value of $\log_2 P_i(t)$ when the value of the current bin y is 1, and has a value of $-\log_2 (1-P_i(t))$ when the value of the current bin y is 0.

Entropy $s_i(t)$ of the current bin is obtained by using the parameter bit; as shown in Equation 11 below.

$$S_i(t) = \text{bit}_i * \alpha_i + (1-\alpha_i) * S_i(t-1) \quad \text{[Equation 11]}$$

In Equation 11, $s_i(t-1)$ is an entropy value obtained with respect to a previous bin of the current bin. Based on Equation 11, if a plurality of entropy values with respect to the current bin are obtained, the context modeler 1420 determines the scaling factor $\alpha_i$ used in an smallest entropy value among entropy $S_i(t)$ as a final scaling factor.

For example, with respect to the current bin y, it is assumed that an entropy value obtained by applying the scaling factor $\alpha_1$ is $S_1(t)$, and an entropy value obtained by applying the scaling factor $\alpha_2$ is $S_2(t)$. In the case of $S_1(t) < S_2(t)$, the scaling factor $\alpha_1$ used to obtain $S_1(t)$ having a smaller entropy value is determined as a scaling factor for a probability update, and the probability is updated according to $p_1(t) = \alpha_1 y + (1-\alpha_1) p_1(t-1)$. In the case of $S_1(t) > S_2(t)$, the scaling factor $\alpha_2$ used to obtain $S_2(t)$ having a smaller entropy value is determined as a scaling factor for a probability update, and the probability is updated according to $p_2(t) = \alpha_2 y + (1-\alpha_2) p_2(t-1)$.

Figure 20A:
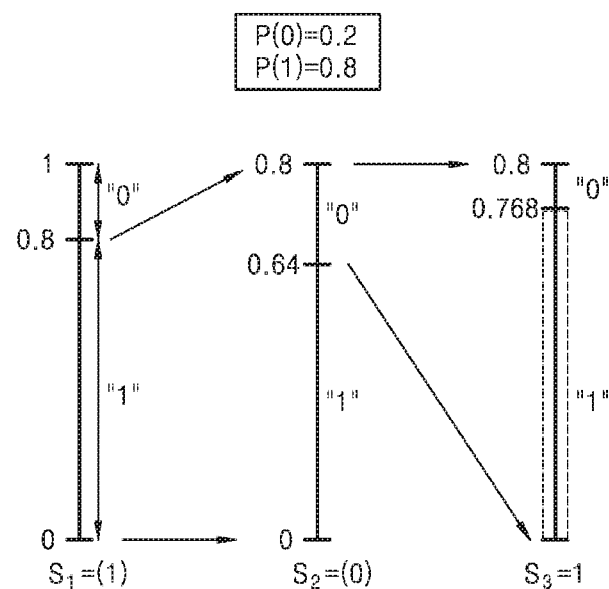
FIGS. 20A and 20B illustrate a process of performing binary arithmetic coding based on CABAC.
Figure 20B:
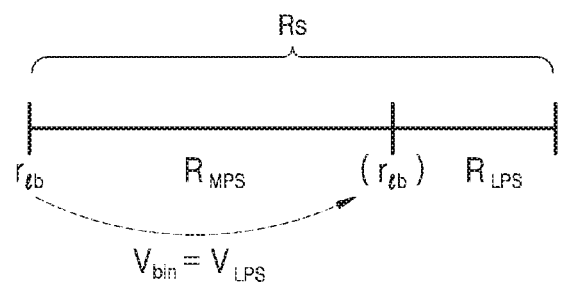

FIGS. 20A and 20B illustrate a process of performing binary arithmetic coding based on CABAC.

Referring to FIG. 20A, the context modeler 1420 provides a predetermined binary value, for example, an occurrence probability P(1) of "1" to the regular coding engine 1432. The regular coding engine 1432 splits a probability section in consideration of a probability regarding whether an input bin is 1 and performs binary arithmetic coding. In FIG. 20A, it is assumed that an occurrence probability of "1" is P(1)=0.8, and an occurrence probability of "0" is P(0)=0.2. Although it is described that P(1) and P(0) are invariable for the sake of description, as described above, values of P(1) and P(0) may be updated whenever one bin is encoded. The regular coding engine 1432 selects (0, 0.8) that is a probability section of the value of "1" in a (0,1) section since S1 that is a previously input bin has a value of 1, selects (0.64, 0.8) that is a probability section corresponding to 0.2 of an upper side of a (0,0.8) section since S2 that is a subsequently input bin has a value of 0, and finally determines (0.64, 0.768) that is a section by 0.8 of (0.64, 0.8) since S3 that is a finally input bin has a value of 1. The regular coding engine 1432 selects 0.75 as a representative value indicating a (0.64, 0.768) section and outputs decimal places "11" in a binary value of 0.11 corresponding to 0.75 as a bitstream. That is, input bins "101' are mapped to "11" and output.

Referring to FIG. 20B, a binary arithmetic coding process according to CABAC is performed by updating a current available range Rs and a lower boundary value $r_{lb}$ of the range Rs. When binary arithmetic coding starts, it is set that Rs=510, $r_{lb}$=0. When a value $v_{bin}$ of a current bin is an MPS, the range Rs is changed to $R_{MPS}$. When the value $v_{bin}$ of a current bin is an LPS, the range Rs is changed to $R_{LPS}$, and the lower boundary value $r_{lb}$ is updated to indicate $R_{LPS}$. As shown in the example of FIG. 20A above, the predetermined section Rs is updated according to whether a value of a current bin is an MPS or an LPS during a binary arithmetic coding process and a binary value indicating the updated section is output.

Figure 21:
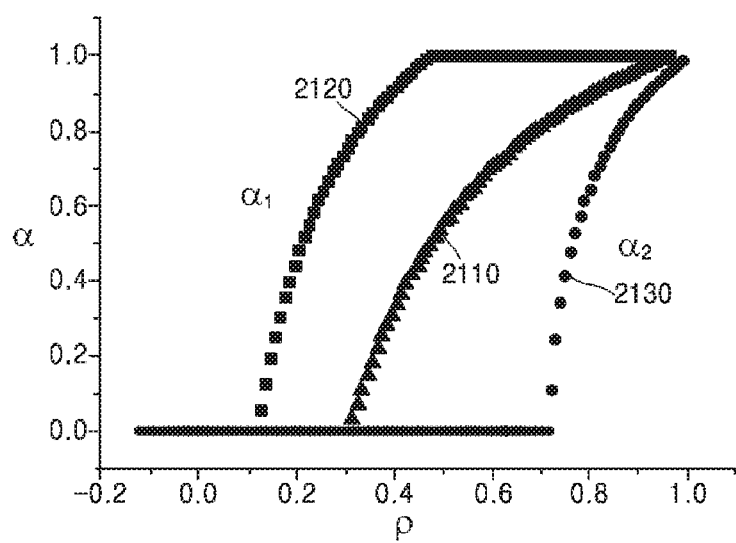
FIG. 21 is a graph of a variation of a scaling factor α determined based on an autocorrelation value $R_k$ according to the number of scaling factors.

FIG. 21 is a graph of a variation of a scaling factor α determined based on an autocorrelation value $R_k$ according to the number of scaling factors.

In FIG. 21, an x axis indicates an autocorrelation value ($R_k = \rho$), and a y axis indicates a scaling factor. When an optimal scaling factor is determined with respect to input bins, if one scaling factor $\alpha_1$ or $\alpha_2$ is used (2120), a scaling factor value may be converged to a predetermined value too slowly or too fast. Thus, two scaling factors (2110) may be used preferably than one scaling factor.

Figure 22:
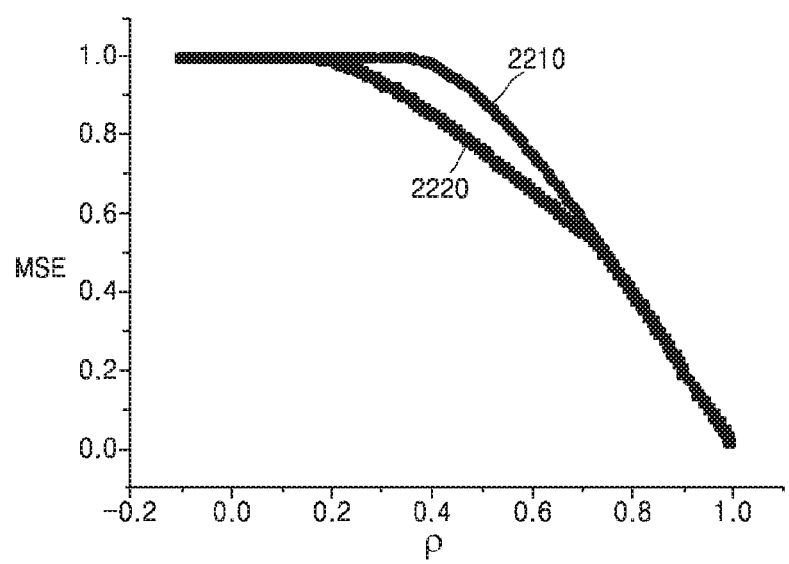
FIG. 22 is a graph of a variation of mean square error (MSE) according to the number of scaling factors.

FIG. 22 is a graph of a variation of MSE according to the number of scaling factors.

In FIG. 22, a reference numeral 2210 denotes an MSE when one scaling factor is used, and a reference numeral 2220 denotes an MSE when two scaling factors are used. In FIG. 22, an x axis indicates an autocorrelation value ($R_k = \rho$), and a y axis indicates an MSE. Referring to FIG. 22, the MSE when two scaling factors are used (2220) is smaller than the MSE when the one scaling factor is used (2210). That is, a probability may be more accurately updated by using the autocorrelation value $R_k$ when the two scaling factors are used than when the one scaling factor is used.

Figure 23:
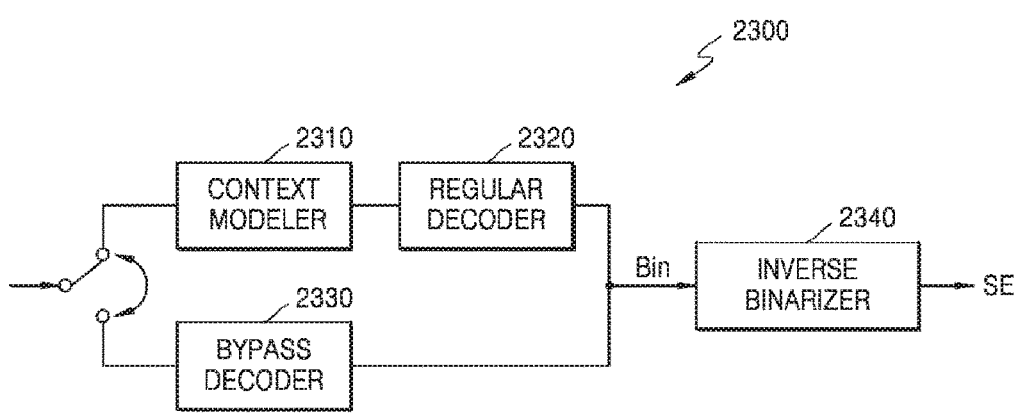
FIG. 23 is a block diagram of an entropy decoding apparatus according to an embodiment of the present disclosure.

FIG. 23 is a block diagram of an entropy decoding apparatus 2300 according to an embodiment of the present disclosure.

Referring to FIG. 23, the entropy decoding apparatus 2300 includes a context modeler 2310, a regular decoder 2320, a bypass decoder 2330, and an inverse binarizer 2340. The entropy decoding apparatus 2300 performs an inverse process of an entropy encoding process performed by the entropy encoding apparatus 1400 described above.

Bins encoded by bypass coding are output and decoded by the bypass decoder 2330. Bins encoded by regular coding are decoded by the regular decoder 2320. The regular decoder 2320 arithmetically decodes a current bin by using a probability of a binary value determined based on previous bins decoded prior to the current bin provided by the context modeler 2310.

The context modeler 2310 provides a probability model with respect to a bin to the regular decoder 2320. Specifically, the context modeler 2310 determines a probability of a predetermined binary value based on a previously decoded bin, updates a probability of a binary value used to decode a previous bin, and outputs the updated probability to the regular decoder 2320. The context modeler 2310 according to an embodiment of the present disclosure may obtain an autocorrelation value of each bin by using values of bins, determine at least one scaling factor used to update a probability of a binary value based on the autocorrelation value, and then update the probability of the binary value by using the determined at least one scaling factor.

Also, the context modeler 2310 according to another embodiment of the present disclosure may obtain entropy values indicating an average bit value of bins by applying a plurality of probability models having different scaling factors, determine a scaling factor having a probability model used to obtain a minimum entropy value among the plurality of probability models, and update a probability of a binary value by using the determined scaling factor. A probability update process performed by the context modeler 2310 is the same as the probability update process included in the encoding process described above, and thus a detailed description thereof is omitted here.

The inverse binarizer 2340 reconstructs bin strings reconstructed by the regular decoder 2320 or the bypass decoder 2330 by mapping the bin strings to syntax elements again.

Figure 24:
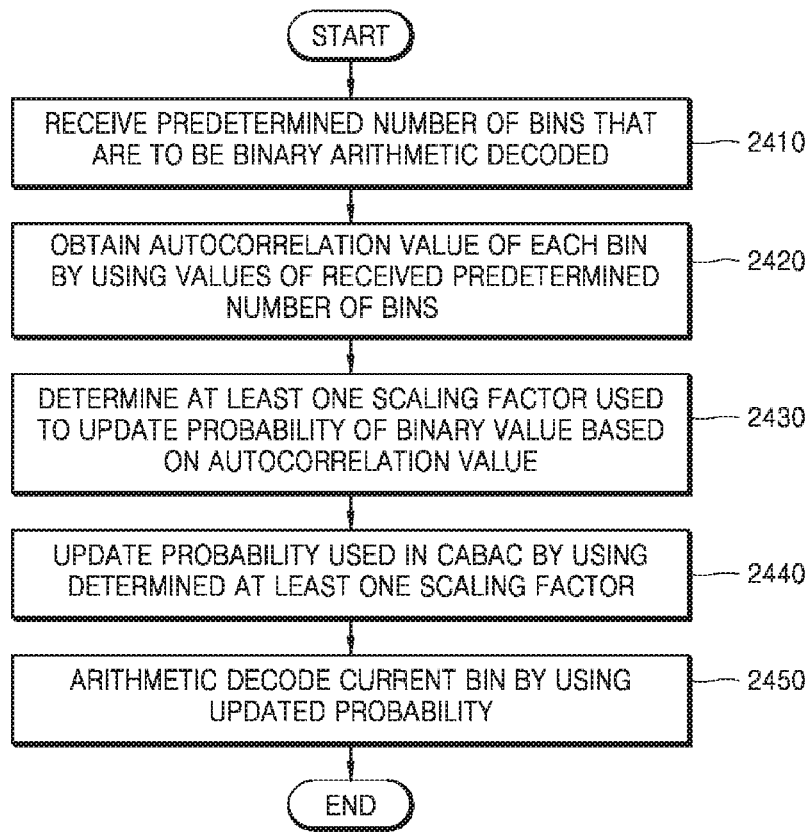
FIG. 24 is a flowchart of a probability update method for binary arithmetic decoding, according to an embodiment of the present disclosure.

FIG. 24 is a flowchart of a probability update method for binary arithmetic decoding, according to an embodiment of the present disclosure.

In operation 2410, the context modeler 2310 receives a predetermined number of bins that are to be binary arithmetic decoded.

In operation 2420, the context modeler 2310 obtains an autocorrelation value of each bin by using values of a predetermined number of received bins. As shown in Equation 3 above, the autocorrelation value $R_k$ is obtained by using values of bins spaced by a predetermined distance k (k is an integer), an average value M of the bins, and a variance a of the bins.

In operation 2430, the context modeler 2310 determines at least one scaling factor used to update a probability of a binary value based on the autocorrelation value. As described above, a probability update method according to an embodiment of the present disclosure uses a value having a minimum MSE between a probability of each bin determined based on the autocorrelation value and a value of each bin as a scaling factor. When one scaling factor is used, one optimal scaling factor may be obtained like in Equation 8

$$\alpha = \frac{(3R_k - 1)}{2R_k}$$

described above. When two scaling factors $\alpha_1$ and $\alpha_2$ are used, an MSE between the probability and the value of each bin may be calculated by substituting $(p_{1,j}+p_{2,j})/2$ instead of $p_j$ of Equation 7 and the scaling factors $\alpha_1$ and $\alpha_2$ that result in a minimum MSE may be determined.

If one or more scaling factors are determined by using an autocorrelation value of bins, in operation 2440, the context modeler 2310 updates a probability used in context-based adaptive binary arithmetic decoding by using the determined one or more scaling factors, and provides the updated probability to the regular decoder 2320. In operation 2450, the regular decoder 2320 binary arithmetic decodes a next bin by using the updated probability.

Figure 25:
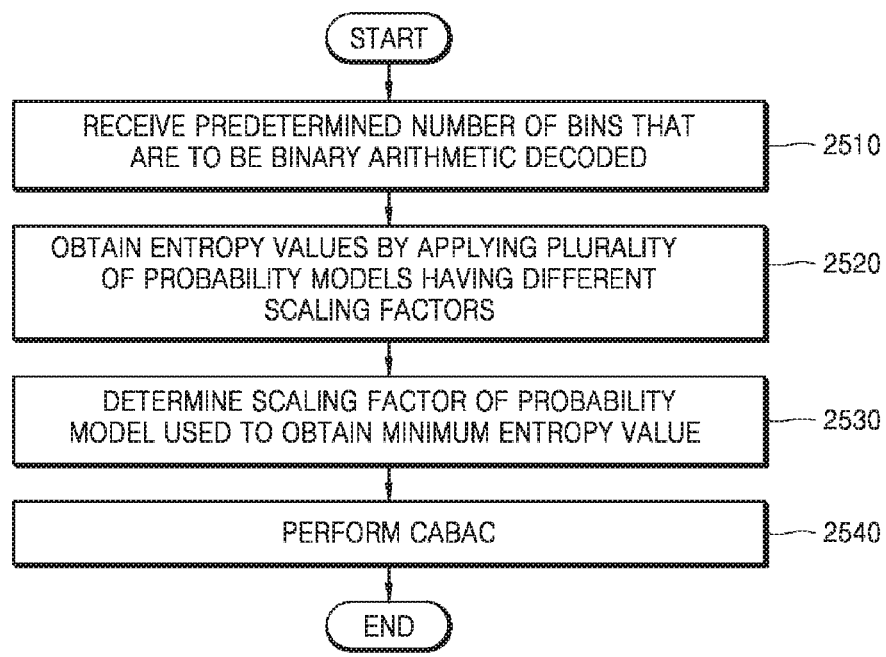
FIG. 25 is a flowchart of a probability update method for binary arithmetic decoding, according to another embodiment of the present disclosure.

FIG. 25 is a flowchart of a probability update method for binary arithmetic decoding, according to another embodiment of the present disclosure.

In operation 2510, the context modeler 2310 receives a predetermined number of bins that are to be binary arithmetic decoded.

In operation 2520, the context modeler 2310 obtains entropy values indicating an average bit value of the bins by applying a plurality of probability models having different scaling factors.

Like the binary arithmetic coding process described above, the context modeler 2310 calculates entropy by applying a plurality of probability models in a bin unit. That is, the context modeler 2310 obtains a parameter $bit_i$ like Equation 10 according to a value of a current bin y, and obtains an entropy $s_i(t)$ of the current bin by using the parameter bit; according to Equation 11.

In operation 2530, the context modeler 2310 determines a scaling factor $\alpha_i$, as a final scaling factor, used in a smallest entropy value among the plurality of entropy values obtained by applying the plurality of scaling factors.

In operation 2540, the context modeler 2310 updates a probability of a previous binary value by using the determined scaling factor and outputs the probably to the regular decoder 2320, and the regular decoder 2320 performs context-based adaptive binary arithmetic decoding on a next bin by using the updated probability.

The disclosure can also be embodied as computer-readable codes on a non-transitory computer-readable recording medium. The non-transitory computer-readable recording medium is any data storage device that can store data which can be thereafter read by a computer system. Examples of the non-transitory computer-readable recording medium include ROMs, RAMs, CD-ROMs, magnetic tapes, floppy disks, optical data storage devices, etc. The non-transitory computer-readable recording medium can also be distributed over network coupled computer systems so that the computer-readable code is stored and executed in a distributed fashion.

While embodiments have been described with reference to the figures, it will be understood by those of ordinary skill in the art that various changes in form and details may be made therein without departing from the spirit and scope as defined by the following claims. Therefore, the scope of the disclosure is defined not by the detailed description of the disclosure but by the appended claims, and all differences within the scope will be construed as being included in the present disclosure.

What is claimed is:

1. A probability update method for binary arithmetic decoding, the method comprising:
    receiving a predetermined number of bins that are to be binary arithmetic decoded;
    obtaining an autocorrelation value of each of the bins by using values of the received predetermined number of bins;
    determining at least one scaling factor used to update a probability of a binary value based on the autocorrelation value;
    updating a probability used in context-based adaptive binary arithmetic decoding by using the determined at least one scaling factor; and
    arithmetic decoding a current bin by using the updated probability,
    wherein the updating a probability comprises:
        obtaining the updated probability by adding a first value and a second value, the first value being obtained by multiplying a value based on the at least one scaling factor by a probability of a previous bin, and the second value being obtained by multiplying the at least one scaling factor by a value of a current bin,
        wherein when a value of the current bin is y (y is 0 or 1), a probability previous to the current bin is p(t−1) (t is an integer), the updated probability is p(t), and the at least one scaling factor is $\alpha$, the updated probability p(t) is obtained according to an equation P(t)=$\alpha$y+(1−$\alpha$)*P(t−1).

2. The probability update method of claim 1, wherein the at least one scaling factor is determined as a value having a minimum mean square error between a probability of each bin determined based on the autocorrelation value and a value of each bin.

3. The probability update method of claim 1, wherein, when the autocorrelation value between the bins spaced by a predetermined distance k (k is an integer) is denoted by $R_k$, an average value of the bins is denoted by M (M is a real number), a variance of the bins is denoted by $\sigma$, the number of bins is denoted by (N+1) (N is an integer), and values of (N+1) bins are denoted by $y_j$ (j is an integer from 0 to N), $R_k$ is obtained according to an equation $$R_k = \frac{1}{\sigma^2}\sum_{j=0}^{N}(y_j - M)(y_{j-k} - M).$$

4. The probability update method of claim 3, wherein the scaling factor is one, and the one scaling factor α is obtained according to an equation $$\alpha = \frac{(3R_k - 1)}{2R_k}$$

according to the obtained autocorrelation value $R_k$.

5. The probability update method of claim 1, wherein the scaling factors are two, and based on a value of the autocorrelation value $R_k$,
when $R_k \in [-1, 1/7]$, the two scaling factors α1 and α2 have a value of 0, when
$$R_k \in [1/7, 1/2], \alpha_1 = 3 - \sqrt{9 - \frac{7R_k - 1}{R_k}}, \alpha_2 = 0;$$

when
$$R_k \in [1/2, 5/7], \alpha_1 = 1, \alpha_2 = 0;$$

and when
$$R_k \in [5/7, 1], \alpha_1 = 1, \alpha_2 = \frac{3R_k - 2 - \sqrt{2R_k^2 - 1}}{R_k - 1}.$$

6. The probability update method of claim 1, wherein when the at least one scaling factor is plural, the plurality of scaling factors are denoted by $\alpha_i$, a value of the current bin is y (y is 0 or 1), a probability previous to the current bin is p(t−1) (t is an integer), and probabilities $p_i(t)$ updated according to the scaling factors $\alpha_i$ are obtained according to an equation $P_i(t)=\alpha_i y+(1-\alpha_i)*P_i(t-1)$, a weight average value of the plurality of updated probabilities $p_i(t)$ is used as a final update probability P(t).

7. A probability update method for binary arithmetic decoding, the method comprising:
receiving a predetermined number of bins that are to be binary arithmetic decoded;
obtaining entropy values indicating an average bit value of the bins by using a plurality of probability models having different scaling factors;
determining a scaling factor of a probability model used to obtain a minimum entropy value among the plurality of probability models;
updating a probability used in context-based adaptive binary arithmetic decoding by using the determined scaling factor; and
performing context-based adaptive binary arithmetic decoding using the updated probability,
wherein the updating a probability comprises:
obtaining the updated probability by adding a first value and a second value, the first value being obtained by multiplying a value based on the at least one scaling factor by a probability of a previous bin, and the second value being obtained by multiplying the at least one scaling factor by a value of a current bin,
wherein when a value of the current bin is y (y is 0 or 1), a probability previous to the current bin is p(t−1) (t is an integer), the updated probability is p(t), and the at least one scaling factor is α, the updated probability p(t) is obtained according to an equation $P(t)=\alpha y+(1-\alpha)*P(t-1)$.

8. The probability update method of claim 7, wherein when a value of a current bin is y, the scaling factors of the plurality of probability models are denoted by $\alpha_i$, a probability of the current bin is $p_i(t)$, and entropy obtained with respect to a previous bin is denoted by $s_i(t-1)$ of entropy of the current bin, the entropy $s_i(t)$ of the current bin is obtained according to an equation $S_i(t)=bit_i*\alpha_i+(1-\alpha_i)*S_i(t-1)$ by using a parameter $bit_i$ obtained according to an equation $bit_i=(y==1)?-\log_2 p_i(t):-\log_2(1-p_i(t))$.

9. An entropy decoding apparatus comprising:
an inverse binarizer configured to map values of predetermined syntax elements to bins of a binary value;
a context modeler configured to receive a predetermined number of bins that are to be binary arithmetic decoded, obtain an autocorrelation value of each bin by using values of the received predetermined number of bins, determine at least one scaling factor used to update a probability of a binary value based on the autocorrelation value, and update a probability used in context-based adaptive binary arithmetic decoding by using the determined at least one scaling factor; and
a regular coder configured to arithmetic decode a current bin by using the updated probability,
wherein the context modeler obtains the updated probability by adding a first value and a second value, the first value being obtained by multiplying a value based on the at least one scaling factor by a probability of a previous bin, and the second value being obtained by multiplying the at least one scaling factor by a value of a current bin,
wherein when a value of the current bin is y (y is 0 or 1), a probability previous to the current bin is p(t−1) (t is an integer), the updated probability is p(t), and the at least one scaling factor is α, the updated probability p(t) is obtained according to an equation $P(t)=\alpha y+(1-\alpha)*P(t-1)$.

\* \* \* \* \*